United States Patent
Ishihara et al.

(10) Patent No.: US 7,462,963 B2
(45) Date of Patent: Dec. 9, 2008

(54) MOTOR COOLING DEVICE AND COOLING METHOD

(75) Inventors: Yuji Ishihara, Zushi (JP); Keiko Shishido, Sagamihara (JP); Hitoshi Shimonosono, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 379 days.

(21) Appl. No.: 11/287,689

(22) Filed: Nov. 28, 2005

(65) Prior Publication Data

US 2006/0113851 A1   Jun. 1, 2006

(30) Foreign Application Priority Data

Nov. 30, 2004  (JP)  ............................ 2004-346024
Jul. 20, 2005  (JP)  ............................ 2005-210075

(51) Int. Cl.
 *H02K 9/00* (2006.01)
(52) U.S. Cl. .............................. 310/58; 310/52; 310/54
(58) Field of Classification Search ............. 310/52–54, 310/57–59, 61, 64
See application file for complete search history.

(56) References Cited

U.S. PATENT DOCUMENTS

| | | | | |
|---|---|---|---|---|
| 3,030,529 A | * | 4/1962 | Jaeschke et al. ............... | 310/53 |
| 3,089,969 A | * | 5/1963 | Wiedemann ................... | 310/53 |
| 3,835,919 A | * | 9/1974 | Lambrecht et al. ............ | 165/47 |
| 3,968,388 A | * | 7/1976 | Lambrecht et al. ............ | 310/53 |
| 4,717,000 A | * | 1/1988 | Waddington et al. ......... | 184/6.1 |
| 4,953,663 A | * | 9/1990 | Sugden ...................... | 184/6.12 |
| 5,034,638 A | * | 7/1991 | McCabria ..................... | 310/54 |
| 5,139,055 A | * | 8/1992 | Pollard .......................... | 141/1 |
| 5,196,746 A | * | 3/1993 | McCabria ..................... | 310/54 |
| 5,886,433 A | * | 3/1999 | Oda et al. ...................... | 310/59 |

FOREIGN PATENT DOCUMENTS

JP   2001-12352   1/2001

* cited by examiner

*Primary Examiner*—Thanh Lam
(74) *Attorney, Agent, or Firm*—Young Basile

(57) ABSTRACT

A motor cooling apparatus and method to auto-circulate coolant to reduce the weight and size of the cooling system. The cooling apparatus includes a coolant path disposed at hot areas of the motor. A reservoir tank is located above the coolant path and gravity feeds coolant to the coolant path. Coolant in the vapor phase discharged from the coolant path is liquefied by a condenser located in a coolant return path. Coolant in the liquid phase is expelled to the reservoir tank under pressure of the vapor-phase coolant in the coolant path to provide for the auto-circulating coolant. Expansion pressure of the coolant supplied by an motor inverter can further increase the pressure of the coolant in the discharging coolant path to improve coolant circulation efficiency to prevent dry out in the coolant path.

24 Claims, 18 Drawing Sheets

MOTOR COOLING DEVICE AND COOLING METHOD

BACKGROUND

The present invention pertains to the technical field of motor cooling devices.

One method of driving electric automobiles that has been proposed is the in-wheel drive system, in which a motor is installed in each wheel. The characteristic features of this in-wheel drive system include an increase in the usable cabin space and independently driven wheels so that a different driving sensation than that of conventional automobiles can be produced.

In order to realize such a drive system, the size of the motor may be made smaller. But as the size of the motor decreases, so too does the area for dissipating the generated heat; thus, the temperature rises significantly.

Cooling systems include liquid-cooling systems and air-cooling systems. In the liquid cooling system, although a higher cooling efficiency can be expected, it is may be necessary to use a pump or another circulating device, as well as conduits for circulating the coolant to the motor installed in each wheel. In this case, a heat exchanger for the coolant is placed near the front grille, and since long conduits may be needed to connect the heat exchanger to the motors, the overall size of the cooling system becomes larger.

A sealed electric compressor has also been proposed in Japanese Kokai Patent Application No. 2001-12352(page 3, FIG. 2), which has a water circulating tube wound on the outer wall of the motor housing, and, in this case, the pump for circulating the coolant is integrally assembled.

It would be desirable to provide a motor cooling device that is smaller and lighter in weight.

SUMMARY

In accordance with one aspect of the present invention, a cooling apparatus is provided for a motor having a rotary shaft, a rotor coupled to the rotary shaft, and a stator surrounding the outer periphery of the rotor. The cooling apparatus includes an inner coolant path disposed in association with hot areas of the motor, which as at least one inlet and one outlet and coolant flowing therein; a reservoir tank adapted to store coolant and having an inlet and an outlet, the reservoir positioned above the inner coolant path; a coolant supply path that connects the outlet of the reservoir tank to at least one inlet of the inner coolant path; a coolant return path that connects at least one outlet of the inner coolant path to the inlet of the reservoir tank; at least one valve interposed between the coolant supply path and at least one inlet of the inner coolant path to stop the backflow of coolant toward the coolant supply path from the inner coolant path; and a heat-dissipating mechanism in the coolant return path to dissipate the heat of the coolant.

In accordance with another aspect of the invention, a method is provided for cooling a motor having a rotary shaft, a rotor coupled to the rotary shaft, and a stator surrounding the outer periphery of the rotor. The method includes storing the coolant in a reservoir that is connected to and placed above an inner coolant path; gravity feeding the coolant from the reservoir into the inner coolant path; circulating coolant through at the inner coolant path to hot areas of the motor; preventing backflow of the coolant from the coolant path to the reservoir means; removing heat from the coolant while circulating the coolant back to the reservoir via a coolant return path; and increasing the discharge pressure of the coolant in the coolant return path.

BRIEF DESCRIPTION OF THE DRAWINGS

The description herein makes reference to the accompanying drawings wherein like reference numerals refer to like parts throughout the several views, and wherein.

DETAILED DESCRIPTION

As explained below, several embodiments of the invention are provided in which coolant from a reservoir tank is gravity-fed through the coolant supply path to the rotor inner path and stator inner path. As the coolant passes through the rotor inner path and stator inner path, the liquid coolant is heated and evaporates due the heat generated by iron and copper losses in the rotor and stator portions, and the evaporated coolant can efficiently cool the rotor and stator. Vapor-phase backflow of the coolant through the rotor inner path and stator inner path to the coolant supply path may be prevented by the check valves. Then, by means of the heat dissipating mechanism, the coolant in the vapor phase and flowing into the coolant return path, after having cooled the rotor and stator, is converted from the vapor phase back to the liquid phase. Under the pressure of the coolant in the vapor phase on the upstream side of the heat dissipating mechanism, the coolant in the liquid phase returns to the reservoir tank. A pressurizer is provided in some embodiments to increase the pressure of the coolant in on the upstream side of the heat dissipating mechanism. The coolant may thus be auto-circulated and therefore the disclosed embodiments may if desired be implemented without a pump or with a smaller pump that might otherwise be required.

Figure 1:
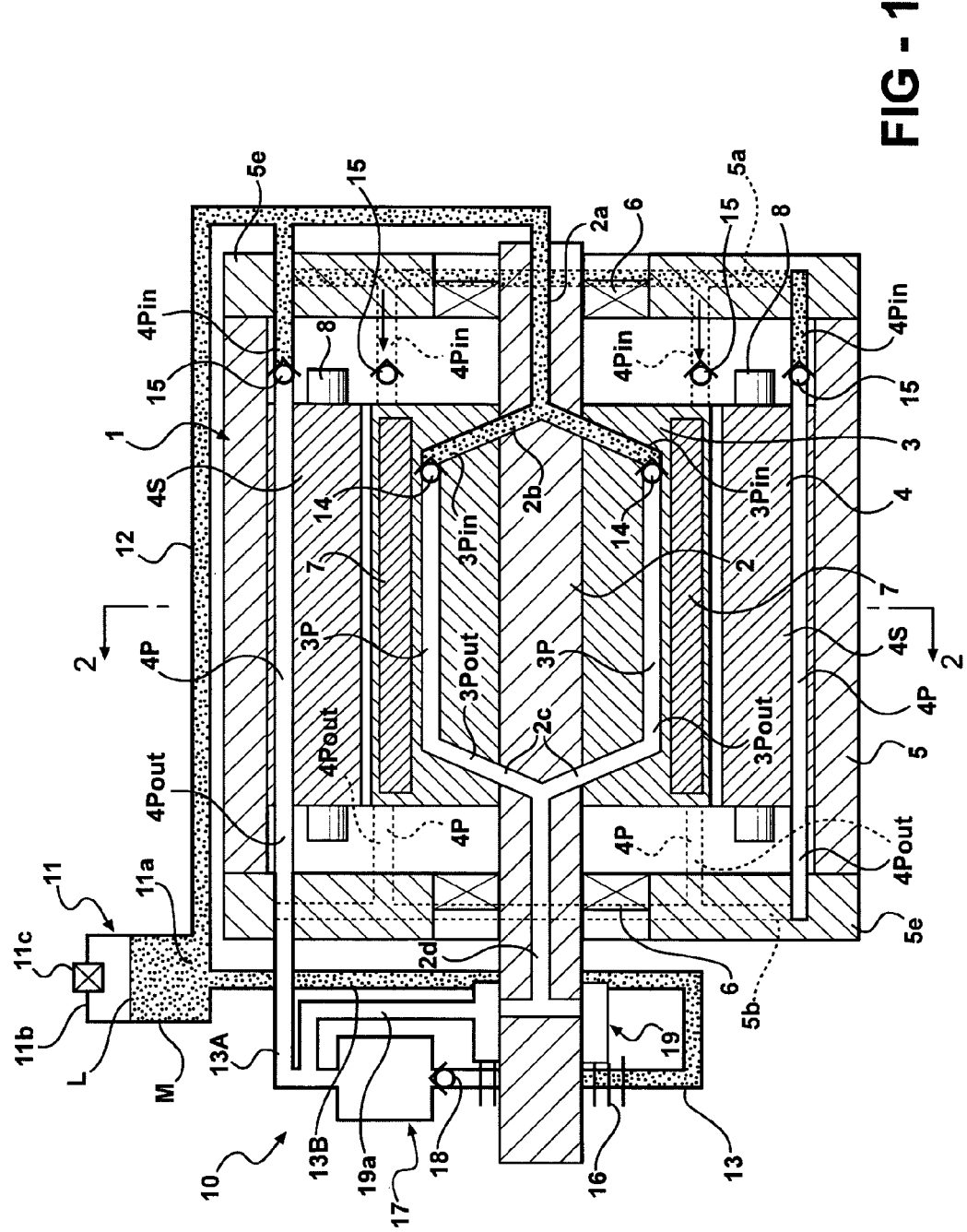
FIG. 1 is a cross-sectional view of a motor having a cooling device according to a first embodiment of the invention.
Figure 2:
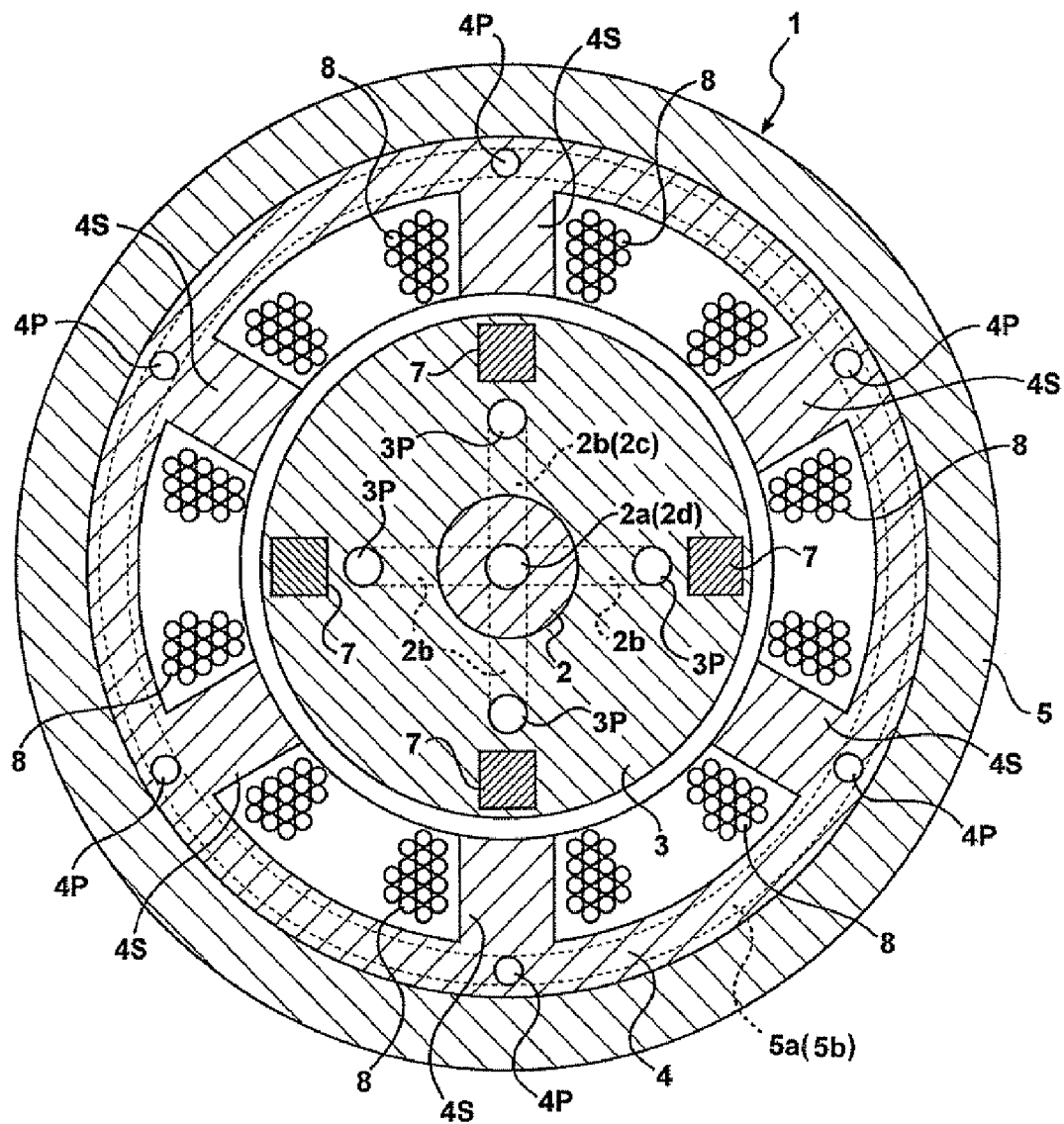
FIG. 2 is a cross-sectional view of the motor in accordance with the first embodiment, taken along the line 2-2 in FIG. 1.
Figure 3:
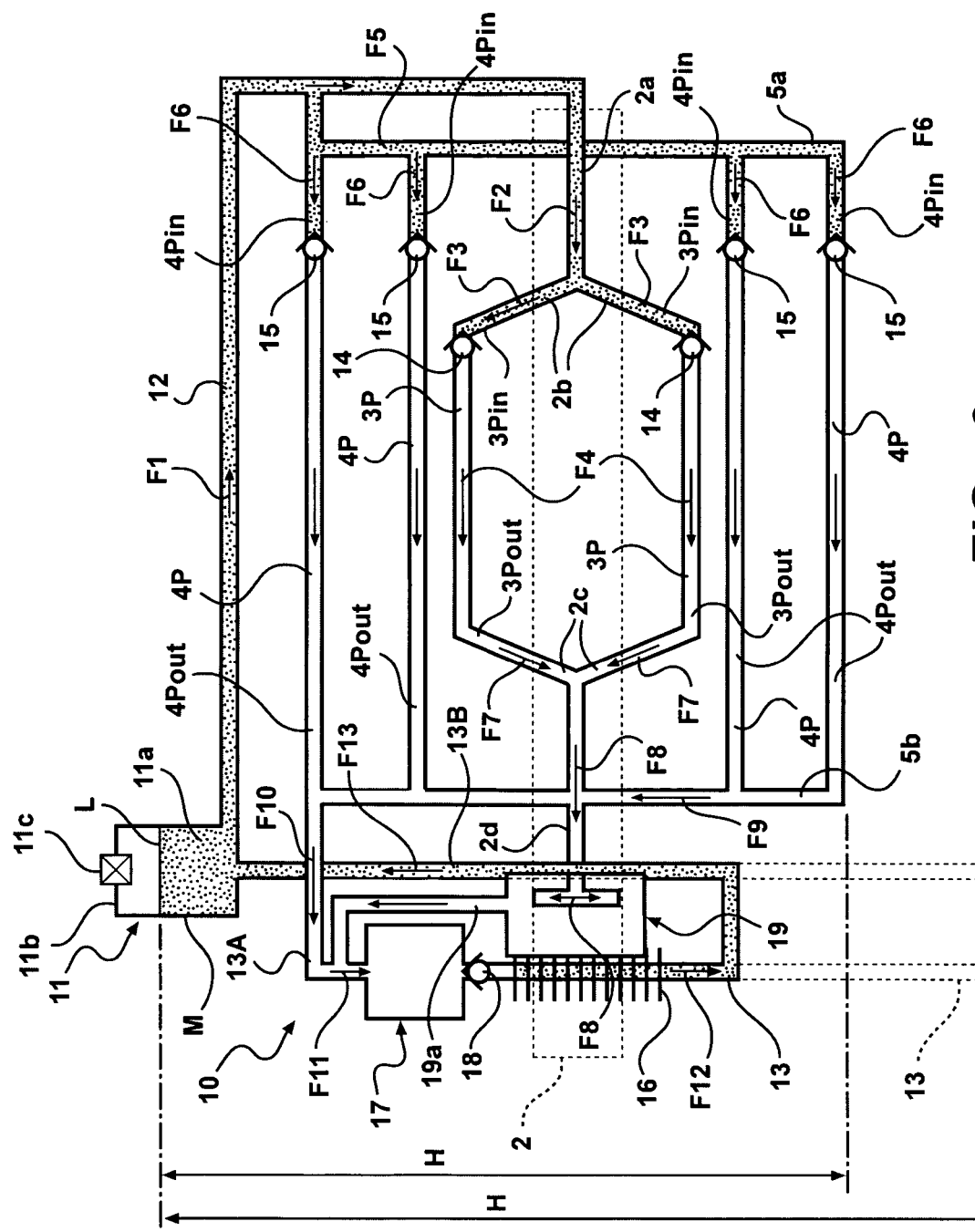
FIG. 3 is a schematic diagram illustrating the coolant circulation path in the cooling device shown in FIG. 1 according to the first embodiment of the invention.
Figure 4:
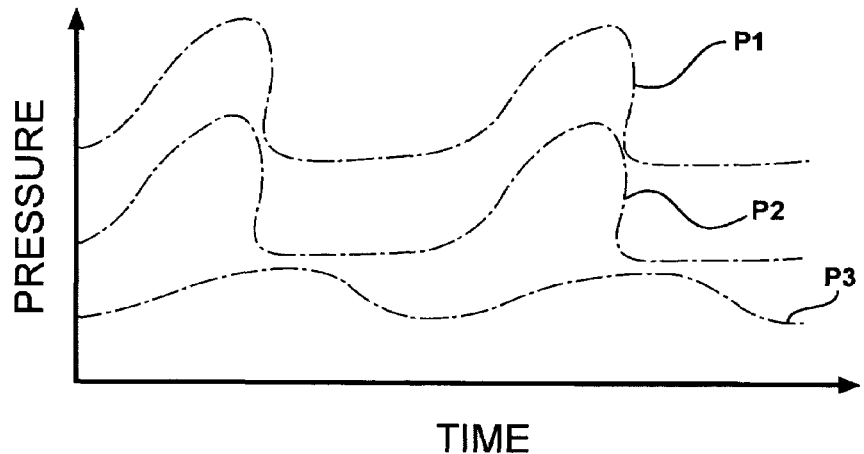
FIG. 4 is a graph illustrating the variation over time of coolant pressure in accordance with the first and other embodiments of the invention.

FIGS. 1-4 illustrate the first embodiment of the motor cooling device and cooling method of the present invention and especially for a vehicle. FIG. 1 is a cross-sectional view of the motor, FIG. 2 is a cross-sectional view taken across 2-2 in FIG. 1, FIG. 3 is a schematic diagram illustrating the constitution of the coolant supply path in the cooling device, and FIG. 4 is a graph illustrating the variation of the coolant pressure over time.

For example, the motor of the present invention may be used in an electric automobile with an in-wheel drive system. In this case, the motor is inserted into the central recess formed on the inner side of each wheel. In this way, the motor is mounted on the vehicle body side, and it can directly drive the wheel with the rotary shaft of the motor.

As shown in FIGS. 1 and 2, motor 1 in this embodiment has a rotary shaft, rotor 3 coupled to the rotary shaft 2, and stator 4 surrounding the outer periphery of the rotor 3, all of which are accommodated in housing 5.

The rotary shaft 2 is integrated with the rotor 3. The ends of the shaft are supported to rotate freely via bearings 6 in end plates 5e at the two ends of housing 5. On the inner side of the peripheral edge portion of rotor 3, a plurality (4 in FIG. 1) of rotor magnets 7 are arranged equidistantly along the axial direction of rotary shaft 2.

The stator 4 is fixed on the inner periphery of housing 5. On the inner periphery of stator 4, a plurality (6 in first embodiment) of stator protruding pole portions 4S are formed, and coil 8 is wound on each the stator protruding pole portions 4S.

As shown in FIG. 1, cooling device 10 has reservoir tank 11 that stores coolant (M), which changes from the liquid phase to the vapor phase from the heat of motor 1. Also, rotor inner path 3P and stator inner path 4P are formed in the rotor 3 and stator 4, respectively. Coolant supply path 12 connects respective inlets 3Pin, 4Pin of the rotor inner path 3P and the stator inner path 4P and the reservoir tank 11, and coolant return path 13 connects respective outlets 3Pout, 4Pout of the rotor inner path 3P and stator inner path 4P and the reservoir tank 11. Also, cooling device 10 has check valves 14, 15, which are set near inlets 3Pin, 4Pin of the rotor inner path 3P and stator inner path 4P and work to stop the backflow of the coolant toward coolant supply path 12, and condenser 16 set in the coolant return path 13 as a heat dissipating mechanism to dissipate heat from the coolant in coolant return path 13 to the outside. The reservoir tank 11 is set at the upper position in the vertical direction with respect to the rotor inner path 3P and stator inner path 4P.

In the motor cooling method in this embodiment, coolant (M) stored in reservoir tank 11 is fed through coolant supply path 12 and via check valves 14, 15 set near inlets 3Pin, 4Pin formed in the rotor 3 and stator 4, to rotor inner path 3P and stator inner path 4P. Then, the coolant (M) returns through coolant return path 13, which contains condenser 16, to reservoir tank 11. The reservoir tank 11 is above the rotor inner path 3P and stator inner path 4P.

In this case, a main chamber 17 has a cross sectional area larger than that of coolant return path 13 and is on the upstream side (upper side of figure) with respect to the condenser 16 of coolant return path 13. A check valve 18 is set between condenser 16 and main chamber 17 to stop the backflow of the coolant toward main chamber 17.

Atmosphere opening port 11c is formed on upper end surface 11b of the reservoir tank 11. Secondary chamber 19 is set at bottom 11a of the reservoir tank 11. The secondary chamber is connected to the head of coolant supply path 12 and the tail of coolant return path 13, and it is set in a position offset with respect to outlet 3Pout of rotor inner path 3P and the main chamber 17 to supply the discharge pressure of rotor inner path 3P.

As shown in FIG. 2, the rotor inner path 3P is formed at four approximately equidistant locations in the circumferential direction corresponding to the locations of four rotor magnets 7, respectively; the stator inner path 4P is formed at six approximately equidistant locations in the circumferential direction corresponding to the respective locations of six stator protruding poles 4S.

As shown in FIG. 1, the rotor inner path 3P is formed near the outer peripheral portion of rotor 3. Infeed path 2a for supplying the coolant from coolant supply path 12 to rotor inner path 3P is formed in rotary shaft 2 as the central portion of the rotor 3 and branched path 2b is formed in the radial direction from infeed path 2a to rotor inner path 3P.

As shown in FIG. 1, the cooling infeed side (the right side of FIG. 1) of rotor inner path 3P is connected via the infeed path 2a formed at one end of rotary shaft 2 and the branched path 2b formed obliquely toward the outer diameter from the infeed path 2a through rotor 3 to coolant supply path 12. At the same time, the coolant discharge side (the left side of FIG. 1) of rotor inner path 3P is connected via branched path 2c formed from rotor 3 through rotary shaft 2 and discharge path 2d formed on the other end of rotary shaft 2 to the secondary chamber 19.

As shown in FIG. 1, the coolant infeed side (right side of FIG. 1) of stator inner path 4P is connected via circular path 5a formed in end plate 5e on one end of housing 5 to the coolant supply path 12. At the same time, the coolant discharge side (left side of FIG. 1) of stator inner path 4P is connected through circular path 5b formed inside end plate 5e on the other end side of housing 5 to the coolant return path 13.

The secondary chamber 19 is connected via path 19a to the part where upstream portion 13A of the coolant return path 13 is connected to main chamber 17. As a result, coolant (M) in rotor inner path 3P and discharged to secondary chamber 19 and coolant (M) in stator inner path 4P and discharged to coolant return path 13 merge and are fed into main chamber 17.

Consequently, as shown in FIG. 3, the flow of coolant (M) in reservoir tank 11 is as follows: it is fed from coolant supply path 12 (flow F1) via infeed path 2a (flow F2) and branched path 2b (flow F3) to rotor inner path 3P (flow F4). It is also fed via circular path 5a (flow F5) to stator inner path 4P (flow F6). Also, coolant (M) in rotor inner path 3P is discharged via branched path 2c (flow F7) and discharge path 2d (flow F8) to secondary chamber 19. Also, coolant (M) in stator inner path 4P is discharged via circular path 5b (flow F9) to upstream portion 13A of coolant return path 13 (flow F10).

Also, coolant (M) discharged to upstream portion 13A of secondary chamber 19 and circular path 5b is fed into main chamber 17 (flow F11). After coolant (M) fed into the main chamber 17 passes through the check valve 18 and the condenser 16 (flow F12), it goes through downstream portion 13B of coolant return path 13 back to reservoir tank 11 (flow F13).

In the cooling method of the present embodiment, coolant (M) is gravity-fed from reservoir tank 11, which is arranged in the uppermost position of cooling device 10, via coolant supply path 12 to rotor inner path 3P and stator inner path 4P. As it passes through the rotor inner path 3P and stator inner path 4P, the coolant in the liquid phase evaporates from the heat generated due to the iron and copper losses in rotor 3, so that the evaporated coolant (M) cools rotor 3 and stator 4 efficiently.

In this case, the backflow of the coolant that enters the vapor phase in rotor inner path 3P and stator inner path 4P in coolant supply path 12 can be prevented by check valves 14, 15. After cooling the rotor 3 and stator 4, coolant (M) in the vapor phase flows into coolant return path 13, and it is converted back from the vapor phase to the liquid phase by means of condenser 16. Under the pressure of coolant (M) in the vapor phase on the upstream side of condenser 16, coolant (M) in the liquid phase can be auto-circulated in reservoir tank 11. It is possible, if desired, to avoid use of a pump or other coolant moving device in the circulation path of coolant, so that it is possible to reduce the size of cooling device 10.

When coolant (M) evaporates in rotor inner path 3P and stator inner path 4P, the heat of evaporation is used to cool rotor 3 and stator 4, so that it is possible to increase the cooling efficiency. At the same time, the quantity of coolant in rotor inner path 3P and stator inner path 4P can be significantly reduced compared to the case of conventional cooling in the liquid phase, so that it is possible to reduce the overall weight of cooling device 10.

Consequently, it is possible to reduce the size and weight of motor 1. As a result, when it is used in an in-wheel drive system, it is easier to assemble the motor in the wheel. Also, since the cooling efficiency of cooling device 10 is greater, it is possible to suppress temperature increases in motor 1 and to maintain the operating state under high loads for longer periods.

An additional feature of the first embodiment is that the main chamber 17 is arranged upstream of condenser 16, placed in coolant return path 13, and check valve 18 is arranged between the condenser 16 and main chamber 17. Consequently, by means of main chamber 17, it is possible to relieve the rapid rise in pressure as coolant (M) evaporates in rotor inner path 3P and stator inner path 4P, so that it is possible to stabilize the pressure of coolant (M) fed to condenser 16. Moreover, check valve 18 stops the backflow of coolant (M) from condenser 16 to main chamber 17 due to variations in the pressure of coolant (M) that changes to the vapor phase due to evaporation.

That is, when rotor 3 and stator 4 are cooled, and coolant (M) reaches a temperature at which evaporation does not take place, the pressure in rotor inner path 3P and rotor inner path 4P falls. Then, as the temperature in rotor 3 and stator 4 starts to rise, coolant (M) evaporates. As the cycle continues, if the peak pressure rise becomes too high, without sufficient heat exchange in condenser 16, coolant (M) returns to reservoir tank 11 in the vapor phase. However, the main chamber 17 acts to suppress variations in pressure.

In this case, in the present embodiment, since, in addition to the main chamber 17, secondary chamber 19 is on the side of rotor inner path 3P, it is possible to further increase the efficiency of suppressing variations in pressure with the two chambers 17, 19.

FIG. 4 illustrates a graph of variations over time in the vapor pressure (P) of cooling device 10 without the chambers 17, 19. P1 represents the case when cooling device 10 does not contain chambers 17, 19, and P2 represents the case when cooling device 10 contains chambers 17, 19. Thus, it can be seen that with chambers 17, 19, it is possible to relieve the rapid rise in pressure due to evaporation of coolant (M) in the liquid phase. Also, in the figure, P3 is used to explain the second embodiment, discussed below.

In addition, while rotor inner path 3P is formed near the outer peripheral portion of rotor 3, infeed path 2a for supplying coolant from coolant supply path 12 to rotor inner path 3P is formed in rotary shaft 2. Because branched path 2b is set in the radial direction from infeed path 2a to rotor inner path 3P, the following function can be realized: because a centrifugal force due to rotation of rotor 3 acts on coolant (M) in the liquid phase present in branched path 2b in the radial direction, it is possible to supply coolant (M) in coolant supply path 12 to rotor inner path 3P by means of a pumping effect. Consequently, it is possible for the diameter of rotor inner path 3P to be smaller than that of stator inner path 4P that supplies coolant (M) solely by means of gravity. As a result, the quantity of coolant (M) in rotor 3 can be correspondingly reduced, so that it is possible to reduce the rotational resistance of rotor 3 caused by the weight of coolant M.

Figure 5:
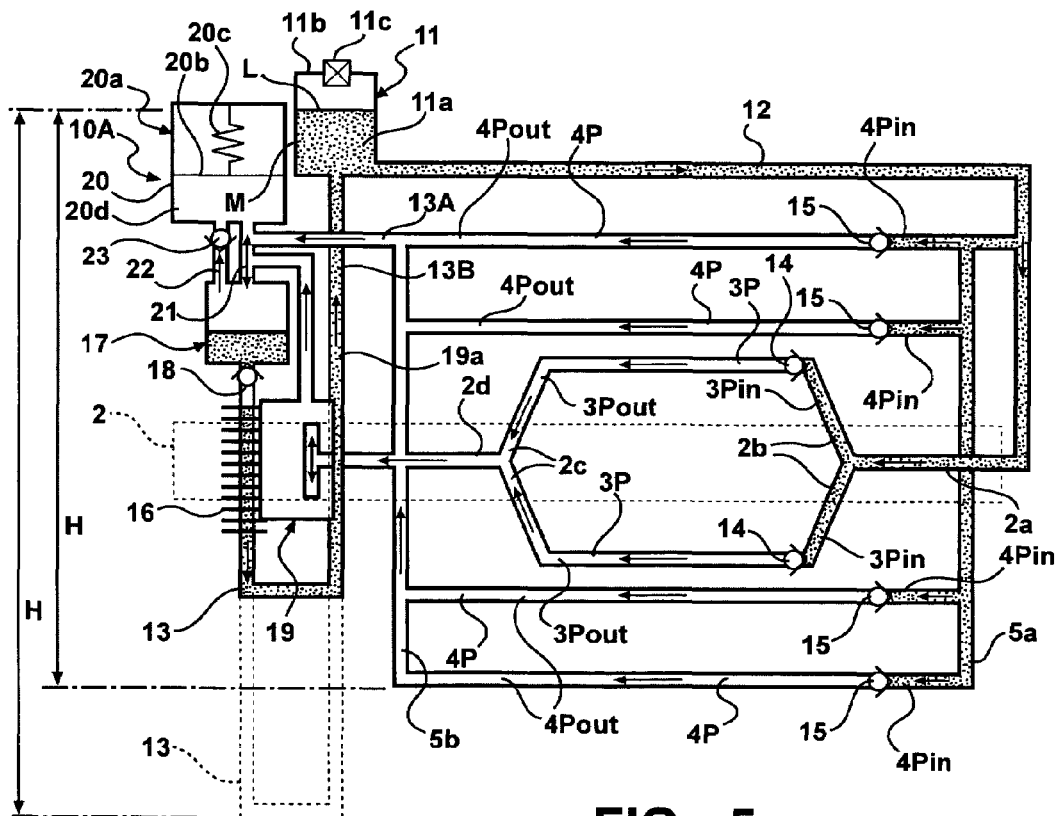
FIG. 5 is schematic diagram illustrating the coolant circulation path in a cooling device according to a second embodiment of the invention.

FIG. 5 is a diagram illustrating the second embodiment of the present invention. The same part numbers as were used in the first embodiment are used again, and their explanation will not be repeated. FIG. 5 is a schematic diagram illustrating the coolant flow path of the cooling device.

As shown in FIG. 5, cooling device 10A in this embodiment basically has the same constitution as that of the first embodiment. It has reservoir tank 11 for storing coolant M, rotor inner path 3P and stator inner path 4P, coolant supply path 12, coolant return path 13, check valves 14, 15 arranged near inlets 3Pin, 4Pin, and condenser 16 placed in coolant return path 13. In addition, the reservoir tank 11 is located above rotor inner path 3P and stator inner path 4P.

Also, while main chamber 17 with check valve 18 is above condenser 16 of coolant return path 13, secondary chamber 19 is used to supply the discharge pressure of rotor inner path 3P.

In this embodiment, accumulator 20 for absorbing variations in internal pressure is placed in (or, alternatively, in fluid communication with) the main chamber 17.

Also, when the accumulator 20 is set, main chamber 17 is connected to accumulator 20 via two connection paths 21, 22. Check valve 23 is placed in one of the two connection paths 21, 22 to stop the flow from accumulator 20 to main chamber 17.

As shown in FIG. 5, the accumulator 20 has piston 20b that can slide freely up/down in sealed container 20a and spring 20c that presses the piston 20b down. The lower chamber formed by piston 20b is pressure adjusting chamber 20d, and the pressure adjusting chamber 20d is connected to the upper portion of main chamber 17 via the connection paths 21, 22.

One connection path 21 of the connection paths 21, 22 is a portion of upstream part 13A of coolant return path 13 shown in the first embodiment, and the other connection path 22 is new to the present embodiment. The check valve 23 is placed in this connection path 22.

As the evaporation of coolant (M) in rotor inner path 3P and stator inner path 4P increases, along with the rise in pressure of coolant (M) in the vapor phase, the vapor pressure in main chamber 17 rises. As a result, the pressure in main chamber 17 is guided via connection paths 21, 22 to pressure adjusting chamber 20d of accumulator 20, so that the volume of pressure adjusting chamber 20d increases.

On the other hand, as the evaporation of coolant (M) in rotor inner path 3P and stator inner path 4P diminishes, and the pressure in main chamber 17 falls, under the force of spring 20c, piston 20b of accumulator 20 descends, and the volume in pressure adjusting chamber 20d decreases. The pressure in the pressure adjusting chamber 20d is guided via connection path 21 to main chamber 17.

Consequently, in this embodiment, as the pressure in main chamber 17 rises, the rapid rise in the pressure in main chamber 17 can be suppressed by the increase in the volume of pressure adjusting chamber 20d of accumulator 20. On the other hand, as the pressure in main chamber 17 falls, the rapid decrease in the pressure of main chamber 17 can be suppressed by the reduction in the volume of pressure adjusting chamber 20d of accumulator 20.

Specifically, in the present embodiment, because main chamber 17 is connected to accumulator 20 via two connection paths 21, 22, and check valve 23 is placed in one connection path 22, when the pressure is fed from main chamber 17 to accumulator 20, coolant (M) in the vapor phase is fed to accumulator 20 via two connection paths 21, 22. Consequently, it is possible to suppress the rise in pressure in main chamber 17 quickly, and when the pressure is returned from accumulator 20 to main chamber 17, since coolant (M) in the vapor phase is fed to main chamber 17 via only one connection path 21, it is possible to suppress the rapid rise in pressure of main chamber 17.

Consequently, the temporal variation in vapor pressure (P) in cooling device 10 in this embodiment as indicated by P3 in FIG. 4 is gradual and slight and the liquefying of coolant (M) in condenser 16 occurs efficiently.

In this way, the present embodiment avoids backflow of liquid coolant to chamber 17 or to the rotor and stator paths. Then, the liquid coolant is again fed through the path and evaporation again takes place. This cycle is repeated. As estimated by the patent applicant if the heat loss in the motor with a power of 20 kW is 10%, there will be a heat loss of 2 kW. In this case, if water is used as the coolant, and the pressure at the periphery of the motor is atmospheric pressure, height difference H between the lowermost part of the flow channel and the liquid surface in the reservoir tank and the flow paths is 1 m, and the water temperature at the outlet of the condenser is 50° C., the maximum water head $\rho gH$ due to the coolant is position $\rho gH=988\times9.8\times1=9682$ N/m$^2$, that is, less than 10% of atmospheric pressure (101.3 kN/m$^2$). In the static case when flow resistance can be ignored, if the pressure in the rotor and stator is at least atmospheric pressure+$\rho gH$=111 kN/m$^2$ or higher, the liquid coolant can return to the reservoir tank. When the saturation pressure of water is 111 kN/m$^2$, the saturation temperature is about 102.3° C., and the effectiveness of the constitution of the present invention is sufficiently high. On the other hand, with respect to the saturation temperature of 102.3° C., the latent heat of evaporation is 2251 kJ/kg, in order to convert all of the saturated water to vapor with a heat generation of 2 kW, one has 2(kW)/2251 (kJ/kg)/998 kg/m$^3$)=8.99×10$^{-7}$(m$^3$/s)=540×10$^{-2}$ (1/min). That is, by supplying 54 cc of cooling water per minute, a low flow rate, it is possible to keep the highest temperature on the periphery of the flow path at a little over 100° C. Also, the pressure depending on the water head position is in the range where the cooling water can be properly fed.

Figure 6:
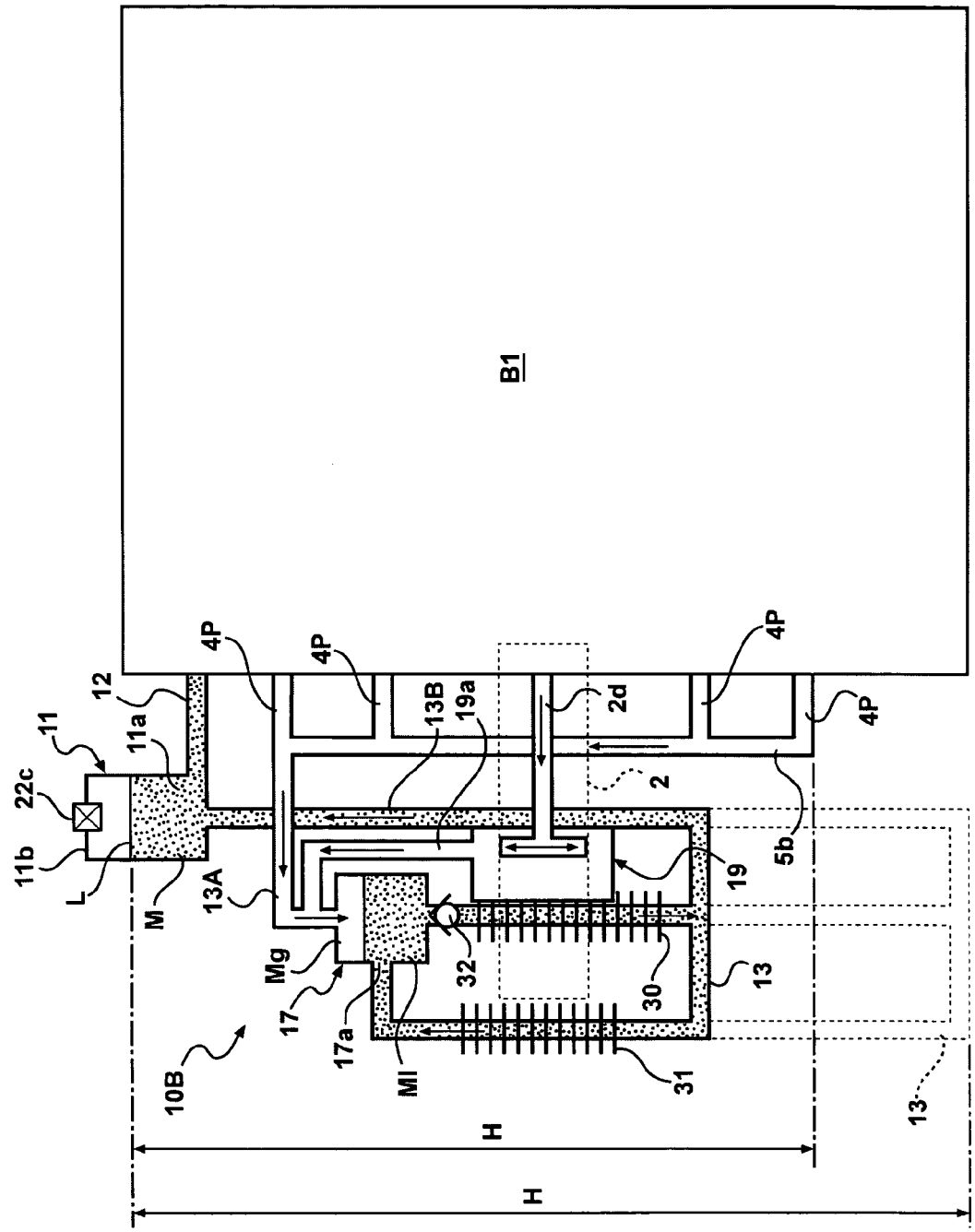
FIG. 6 is a schematic diagram illustrating the coolant circulation path in a first operational state of a cooling device according to a third embodiment of the invention.
Figure 7:
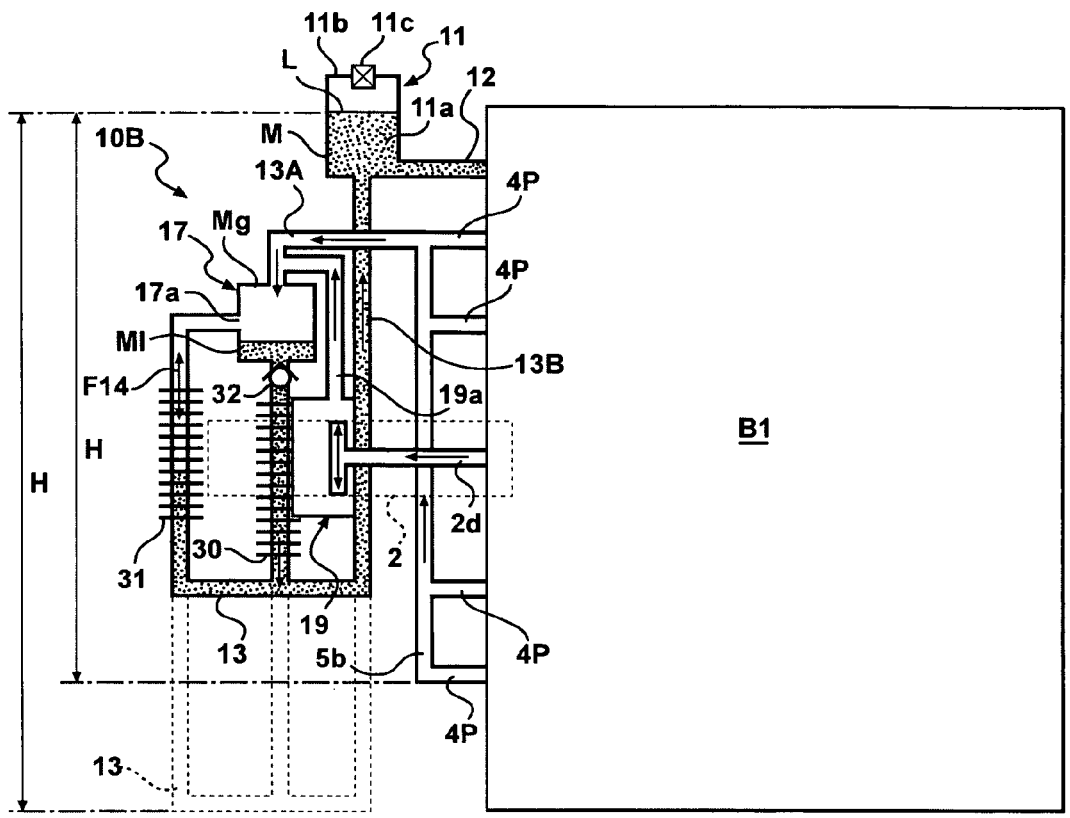
FIG. 7 is a schematic diagram illustrating the coolant circulation path in a second operational state of the cooling device shown in FIG. 6.

FIGS. 6 and 7 illustrate the third embodiment of the present invention. The same part numbers as were used in the first embodiment are used again, and their explanation will not be repeated. FIG. 6 is a schematic diagram illustrating the main part of the coolant flow path of the cooling device. FIG. 7 is a schematic diagram illustrating the main part in the operating state of the coolant flow path of the cooling device.

As shown in FIGS. 6 and 7, like the first embodiment, cooling device 10B of the present embodiment has reservoir tank 11 for storing coolant (M), main chamber 17 and secondary chamber 19. As shown in this figure, as in the first embodiment, coolant supply path 12, rotor inner path 3P and stator inner path 4P are illustrated as black box B1.

In the present embodiment, lower condenser 30 is used as the lower heat dissipating mechanism with the connection position to the main chamber 17 located at the lower position, and upper condenser 31 is used as the upper heat dissipating mechanism with the upper connecting position of the main chamber 17. The resistance of coolant flow of lower condenser 30 is higher than that of upper condenser 31, and check valve 32 is set between lower condenser 30 and upper condenser 31 and main chamber 17 to prevent backflow to main chamber 17.

In this case, like condenser 16 in the first embodiment, lower condenser 30 is connected to the bottom surface of main chamber 17. On the other hand, upper condenser 31 is connected via opening portion 17a formed on the side surface of main chamber 17 to main chamber 17.

In this embodiment, lower condenser 30 and check valve 32 may have the same constitution as condenser 16 and check valve 18 in the first and second embodiments. Also, the coolant discharge side of upper condenser 31 is connected to downstream portion 13B of coolant return path 13, like the coolant discharge side of the lower condenser 30.

Since the diameter of the flow path of the upper condenser 31 is smaller than that of lower condenser 30, or since a throttle valve or other resistive element can be placed in the flow path, it is possible for the flow resistance of coolant (M) of upper condenser 31 to be greater than that of lower condenser 30.

FIG. 6 is a diagram illustrating the case when vapor-phase coolant (Mg) and liquid-phase coolant (Ml) are mixed in main chamber 17, and the liquid surface of liquid-phase coolant (Ml) is higher than that of opening part 17a of upper condenser 31. In this case, after liquid-phase coolant (Ml) in main chamber 17 flows through both lower condenser 30 and upper condenser 31, it flows back from downstream portion 13B of coolant return path 13 to reservoir tank 11.

FIG. 7 is a diagram illustrating the case when the pressure of main chamber 17 increases and the liquid surface of liquid-phase coolant (Ml) is below opening part 17a of upper condenser 31. In this case, vapor-phase coolant (Mg) flows into upper condenser 31.

Consequently, in the present embodiment, as the pressure in main chamber 17 increases, as shown in FIG. 7, due to the difference in the flow resistance, the pressure of vapor-phase coolant (Mg) flows into upper condenser 31, and when the pressure in main chamber 17 falls from this state, vapor-phase coolant (Mg) in upper condenser 31 flows from opening portion 17a into main chamber 17.

Consequently, the coolant (M) in upper condenser 31 (flow F14) has different flow directions corresponding to the pressure in main chamber 17, and it is possible to suppress rapid rise/fall in pressure of main chamber 17. As in the second embodiment, as indicated by P3 in FIG. 4, the variation over time of vapor pressure (P) in cooling device 10 is reduced, so that the liquefying of coolant (M) in condenser 16 can be performed with greater stability and efficiency.

Specifically, when the state is changed from that shown in FIG. 7 to that shown in FIG. 6, once coolant (M) has passed upper condenser 31 and its temperature has dropped, it is again used in heat exchange in upper condenser 31. Consequently, the temperature of coolant (M) that has returned to reservoir tank 11 can be further lowered.

Figure 8:
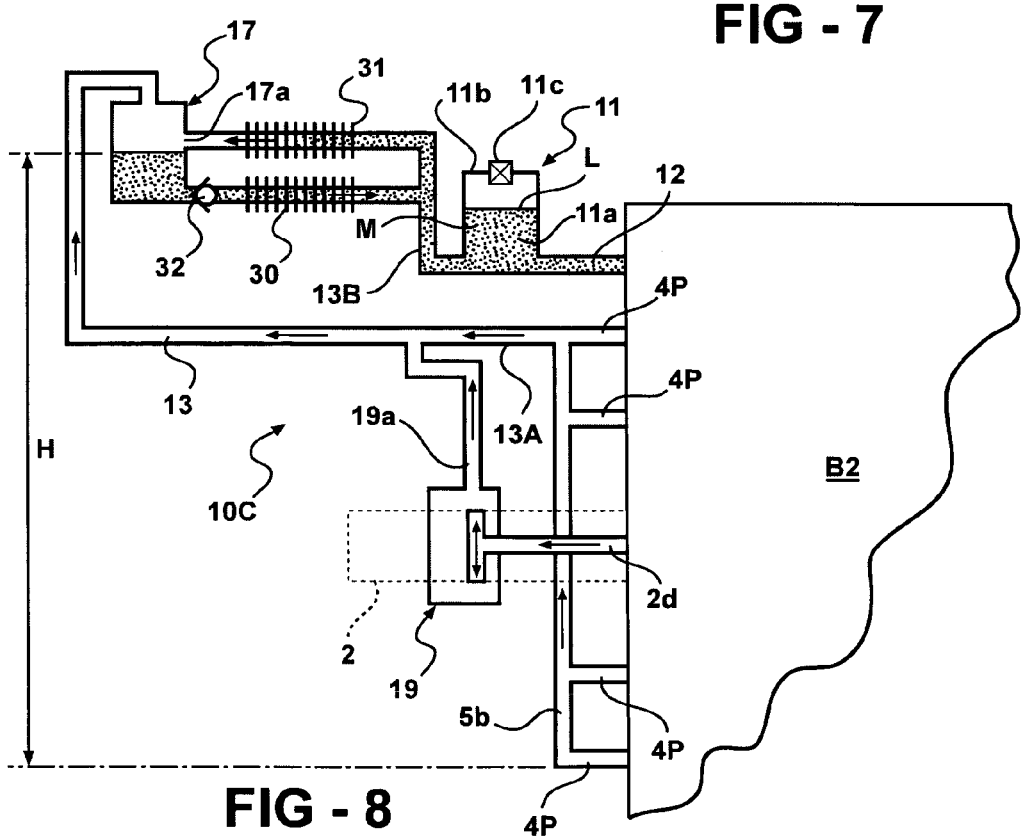
FIG. 8 is a schematic diagram illustrating the coolant circulation path in a cooling device according to a fourth embodiment of the invention.

FIG. 8 is a diagram illustrating a fourth embodiment of the present invention. The same part numbers as were used in the third embodiment are used again, and their explanation will not be repeated. FIG. 8 is a diagram illustrating the main part illustrating the coolant flow path of the cooling device.

As shown in FIG. 8, the cooling device 10C is basically identical to that of the third embodiment. It has lower condenser 30 with the connecting position to main chamber 17 located at the lower position, and upper condenser 31 with the connecting position located at the upper position in the vertical direction. Check valve 32 is placed between lower condenser 30 and main chamber 17 to stop the backflow to main chamber 17.

As in the first embodiment, reservoir tank 11 storing coolant M, main chamber 17, and secondary chamber 19 are used. Also, as in the first embodiment, coolant supply path 12, rotor inner path 3P and stator inner path 4P are illustrated as black box B2 shown in the figure.

In this embodiment, as a heat dissipating mechanism, the lower condenser 30 and upper condenser 31 are located at the upper position with respect to coolant liquid surface (L) of reservoir tank 11.

Consequently, in this embodiment, not only the same effects as those of the third embodiment can be realized, but also the following effect can be realized: because lower condenser 30 and upper condenser 31 are positioned at the upper position with respect to coolant liquid surface L of reservoir tank 11, when coolant (M) that flows through rotor inner path 3P and stator inner path 4P into main chamber 17 is in the vapor phase, no pressure is required to return coolant (M) that has been converted into the liquid phase in lower condenser 30 and upper condenser 31 to reservoir tank 11, and it is possible to circulate evaporated coolant (M) in rotor inner path 3P and stator inner path 4P at a lower pressure of coolant (M).

Of course, this embodiment can be adopted in the case when single condenser 16 of the first and second embodiments is used.

Figure 9:
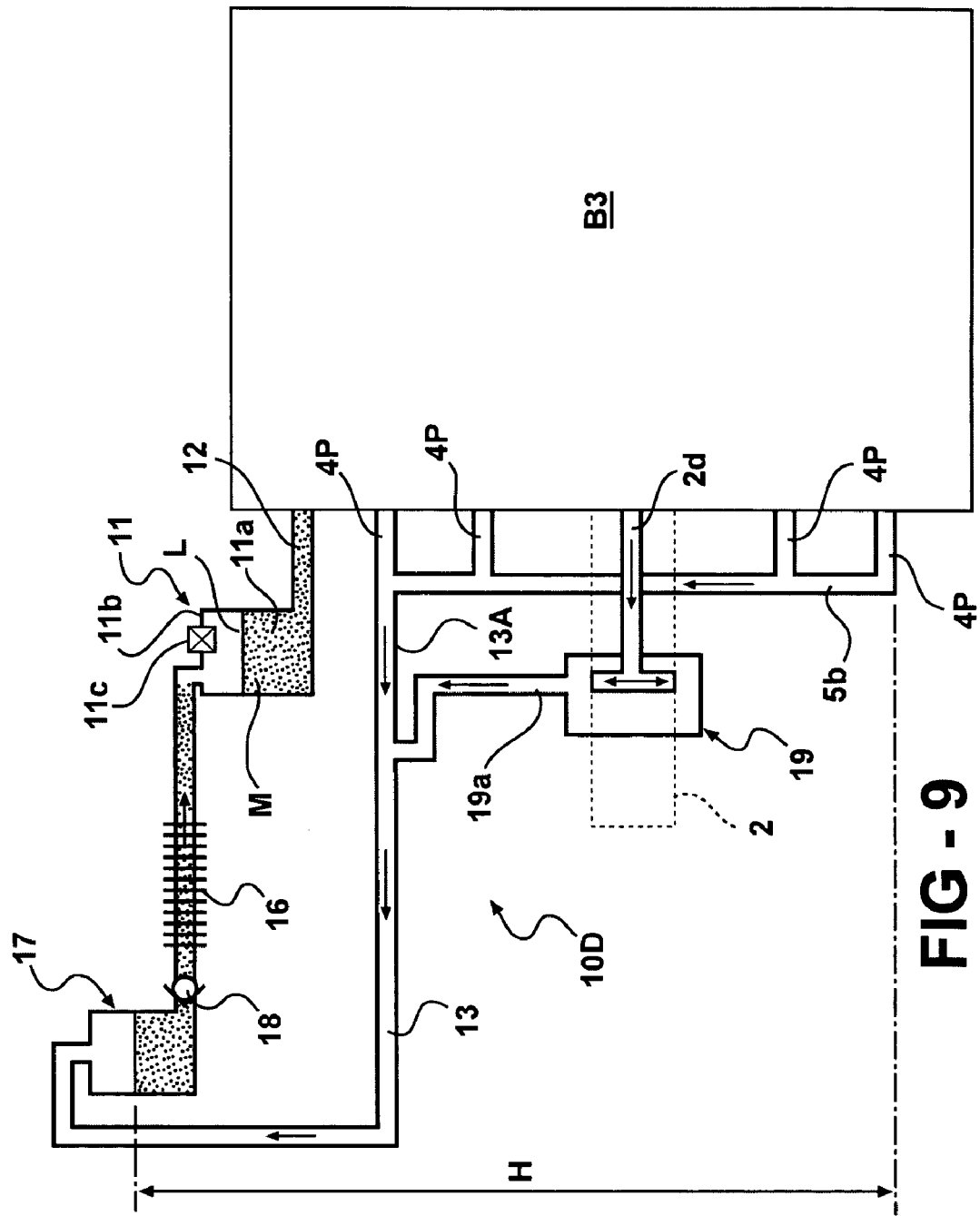
FIG. 9 is a schematic diagram illustrating the coolant circulation path in a cooling device according to a fifth embodiment of the invention.

FIG. 9 is a schematic diagram illustrating the fifth embodiment of the present invention illustrating a main part of the coolant supply path in the coolant device. The same part numbers as were used in the first embodiment are adopted, and their explanation will not be repeated.

As shown in FIG. 9, cooling device 10D of this embodiment has approximately the same constitution as that of the first embodiment. It has reservoir tank 11 that stores coolant M, condenser 16, main chamber 17 and secondary chamber 19. Also, as in the first embodiment, coolant supply path 12, rotor inner path 3P and stator inner path 4P are illustrated as black box (B3).

In this embodiment, the condenser 16 is arranged at the upper position in the vertical direction from upper end surface 11b of reservoir tank 11, and condenser 16 is connected to upper end surface 11b of reservoir tank 11.

Consequently, in this embodiment, in addition to the same effects realized in the first and second embodiments that include condenser 16, there is also the following effect: because condenser 16 is arranged in the upper position with respect to upper end surface 11b of reservoir tank 11, and condenser 16 is connected to upper end surface 11b of reservoir tank 11, when coolant (M) that flows through rotor inner path 3P and stator inner path 4P into main chamber 17 is in the vapor phase, no pressure is required to return coolant (M) converted into the liquid phase in condenser 16 to reservoir tank 11, and it is possible to circulate evaporated coolant (M) that is in rotor inner path 3P and stator inner path 4P at a lower pressure of coolant (M).

Also, since condenser 16 is set at the upper position with respect to upper end surface 11b of reservoir tank 11, the pressure of the water head with respect to coolant liquid surface (L) in reservoir tank 11 does not act on condenser 16, so that coolant (M) can be circulated at a pressure lower than that in the fourth embodiment.

Of course, this embodiment also can be adopted in the case when single condenser 16 is set as in the first and second embodiments, and in the case when two condensers 30, 31 are set as in the third embodiment.

In the 1st through 5th embodiments, for coolant (M) used in cooling devices 10-10D, if the pressure in main chamber 17 is (p), the liquid density of coolant (M) is ($\rho$), the acceleration due to gravity is (g), and the height between coolant liquid surface (L) in reservoir tank 11 and stator inner path 4P in the lowermost position in the vertical direction is H (see FIGS. 3, 5-8), then the coolant is used having properties meeting the formula:

$$p > \rho \cdot g \cdot H \quad [1]$$

Also, as indicated by the broken lines in FIGS. 3 and 5-7, when the lowermost position of coolant return path (13) is below stator inner path 4P, the (H) becomes the height between the lowermost position in the vertical direction of coolant return path (13) and cooling liquid surface (L) of reservoir tank 11.

Consequently, by making the properties of coolant (M) meet the requirement of the formula 1, even when coolant (M) is present in the vapor phase in one of the flow paths of cooling device 10, it is possible to return coolant (M) to reservoir tank 111 without necessarily having to use a pump.

In the first through fifth embodiments, condenser 16 and condensers 30, 31 are shown as single straight pipes. However, the coolant may also pass through plural straight pipes, as in a conventional heat exchanger, or through a cooling network.

In addition, as shown in FIG. 2, there are four rotor inner paths 3P and six stator inner paths 4P. However, the number of rotor inner paths 3P and stator inner paths 4P is not limited to the this example. The number of paths can be selected as needed for the effective cooling of motor 1.

Figure 10:
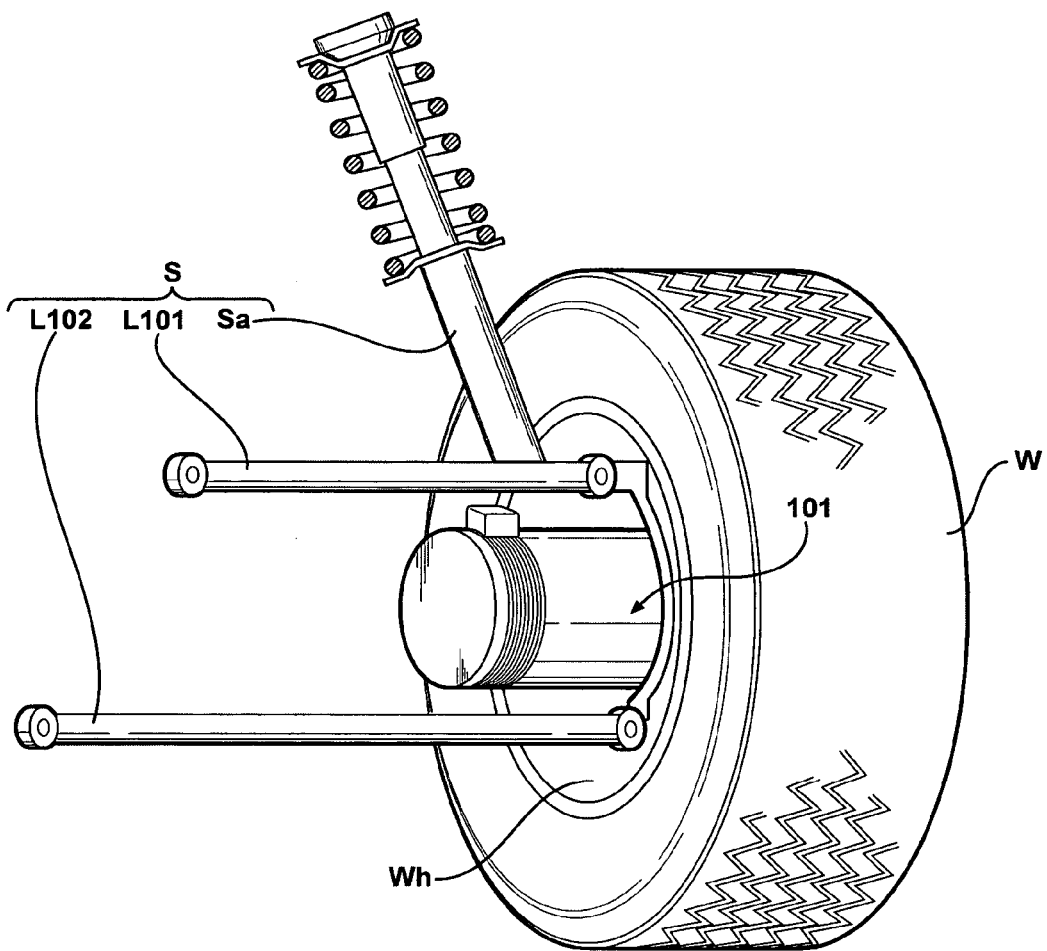
FIG. 10 is the perspective view of an in-wheel drive system in which the various embodiments of the invention may be installed.
Figure 11:
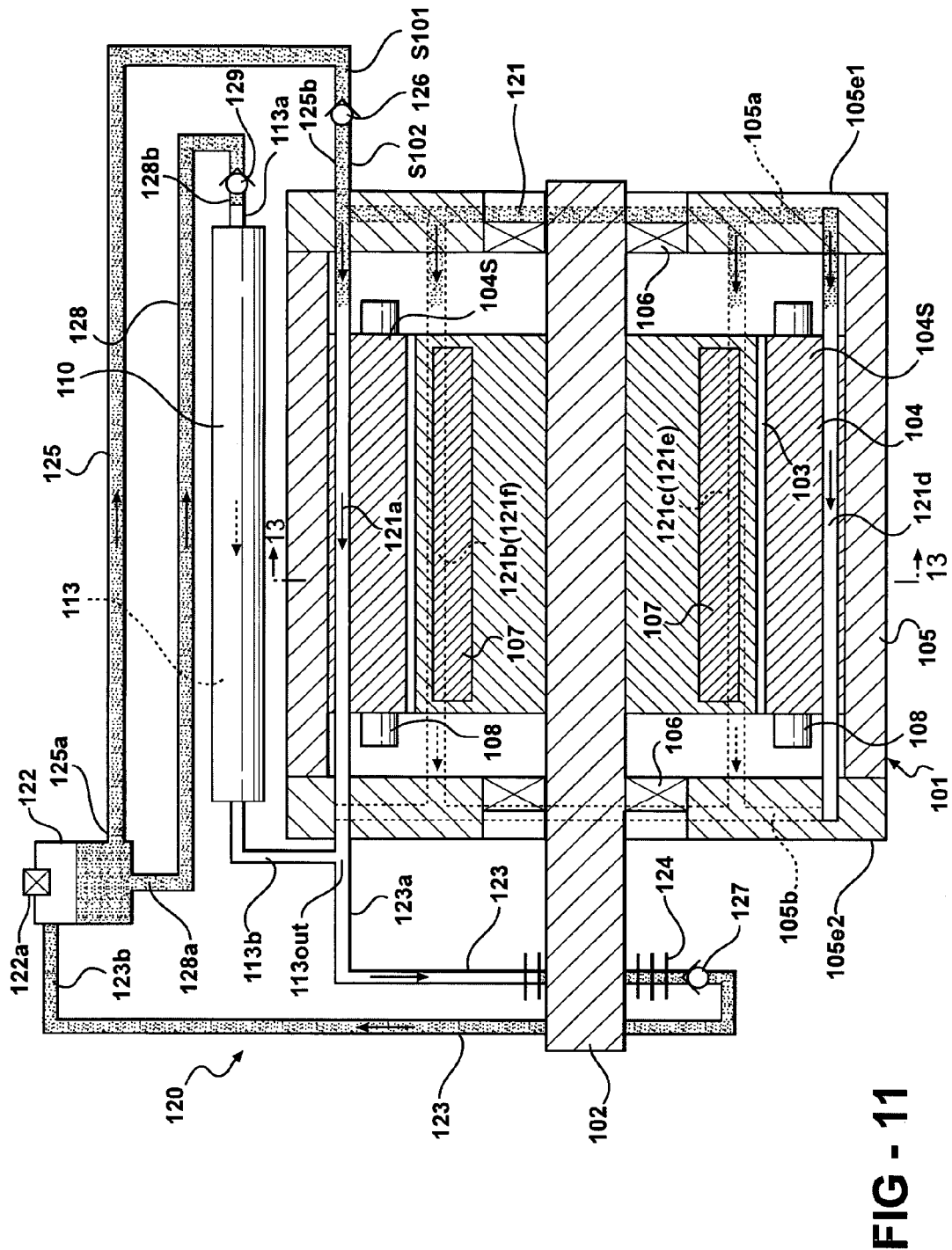
FIG. 11 is a cross-sectional view of the motor having a cooling device according to a sixth embodiment of the invention.
Figure 12:
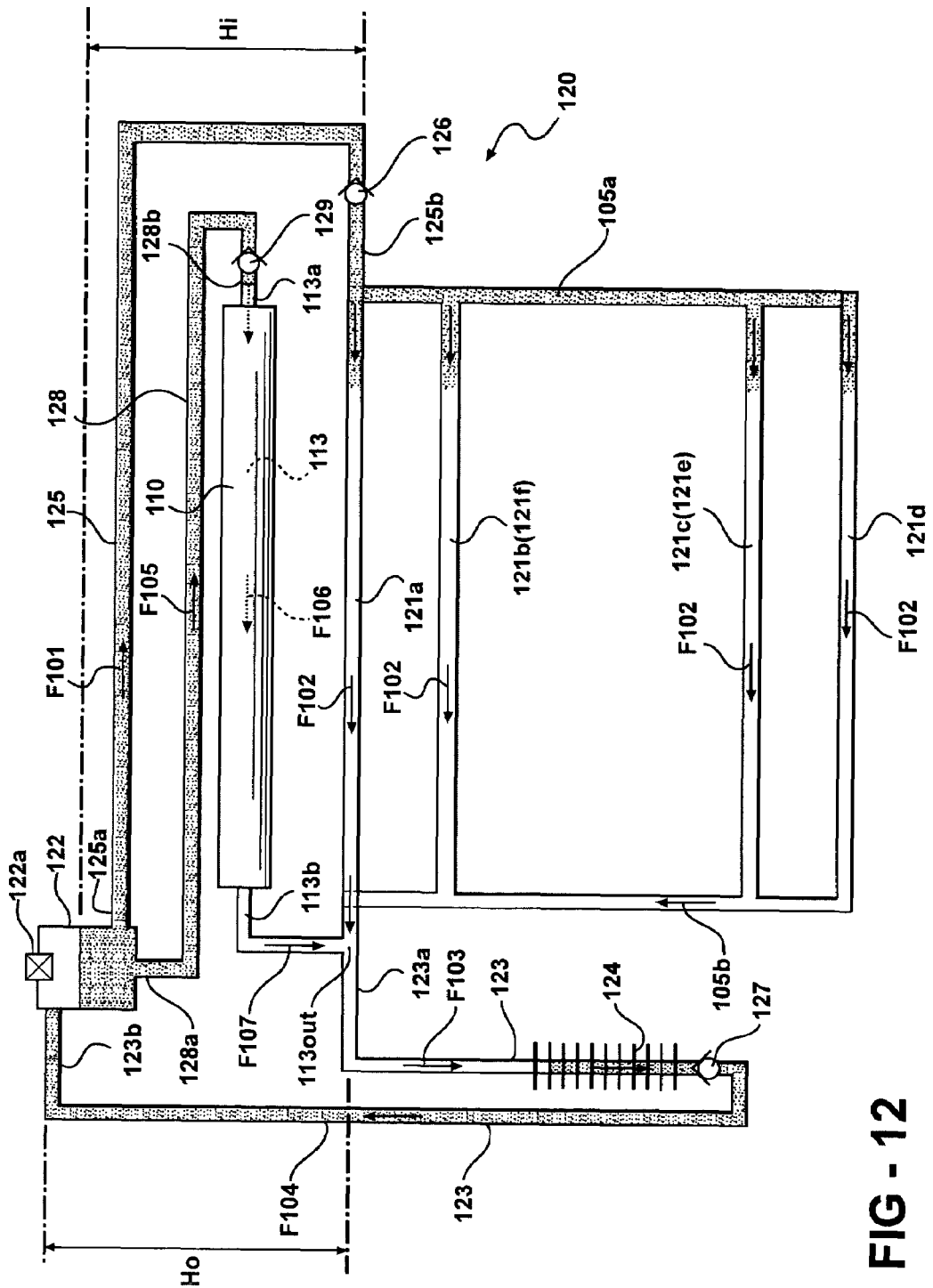
FIG. 12 is a schematic diagram illustrating the coolant circulation path in the cooling device shown in FIG. 11 according to the sixth embodiment of the invention.
Figure 13:
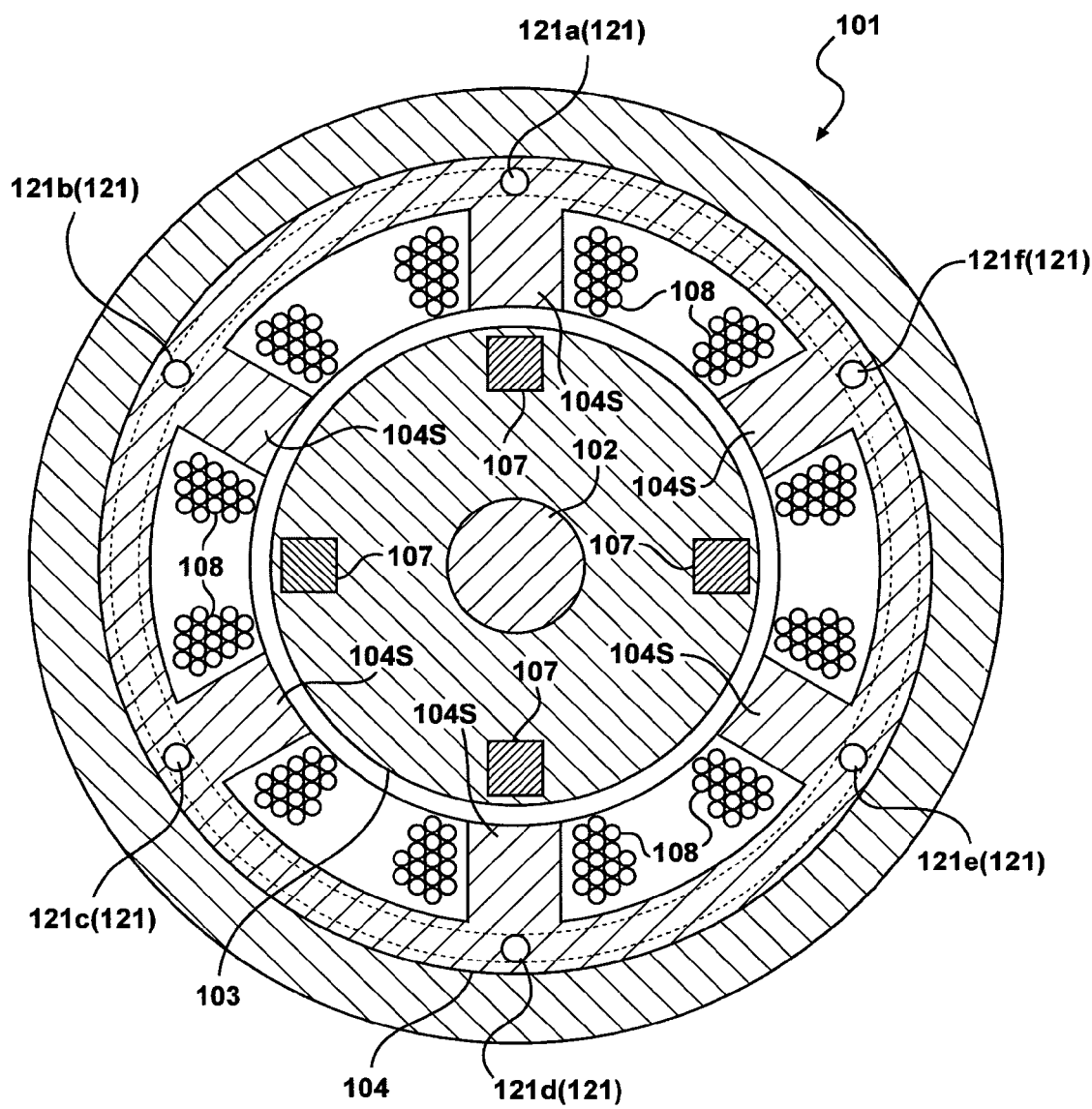
FIG. 13 is a cross-sectional view of the sixth embodiment of the invention, taken along the line 13-13 of FIG. 11.

FIGS. 10-15 show the sixth embodiment of the motor cooling apparatus disclosed in the present invention. FIG. 10 is the oblique view of a suspension device showing the installation of the motor to which the present invention is applied. FIG. 11 is the cross-sectional view of the motor in which the cooling apparatus is assembled. FIG. 12 is a diagram illustrating the coolant circulation path of the cooling apparatus. FIG. 13 is the cross section along line 13-13 in FIG. 11.

Figure 14:
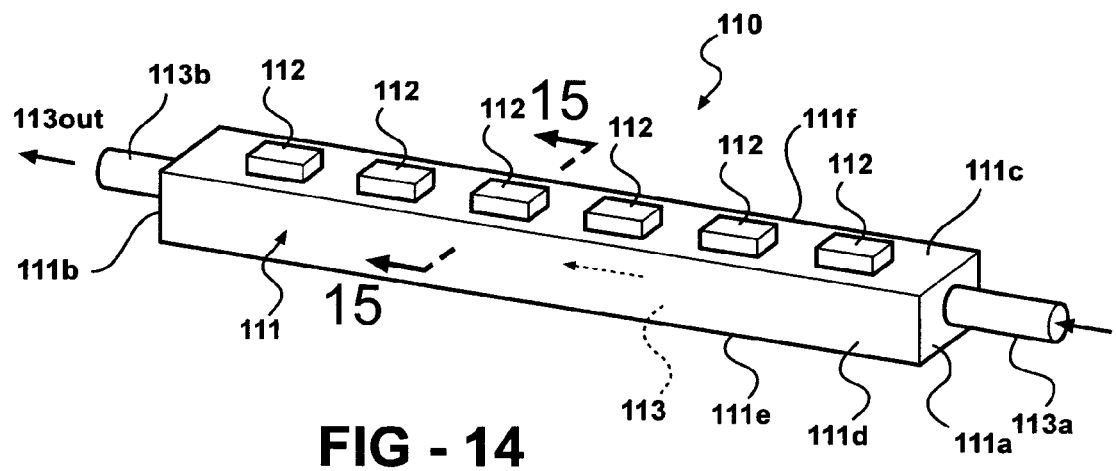
FIG. 14 is an enlarged perspective view of the motor inverter shown in FIG. 11.
Figure 15:
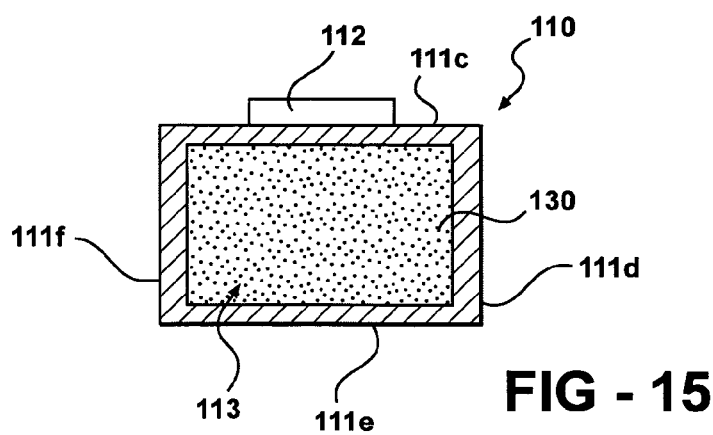
FIG. 15 is an enlarged cross-section of the motor inverter, taken on the line 15-15 in FIG. 14.

FIG. 14 is the enlarged oblique view of the motor inverter. FIG. 15 is an enlarged cross section along line 15-15 in FIG. 14.

Motor 101 to which the cooling apparatus 120 of the present invention is applied can be used in an in-wheel drive type electric automobile as shown in FIG. 10. Motor 101 is installed on the side of the vehicle body and is inserted into the central concave part (Wh) formed on the back side of tire (W). Tire (W) is directly driven by the rotary shaft of motor 101.

The tire (W) is supported on the vehicle body by a double wishbone suspension device (S) having upper link (L101), lower link (L102), and shock absorber (Sa). However, the suspension device (S) is not limited to the double wishbone type.

As shown in FIGS. 11, 13, the motor 101 has rotary shaft 102, rotor 103 coupled to the rotary shaft 102, and stator 104 surrounding the outer periphery of rotor 103. The rotary shaft 102, rotor 103 and stator 104 are accommodated in housing 105.

Rotary shaft 102 is integrated with rotor 103. The two ends are supported to rotate freely via bearings 106 by end plates 105e1, 105e2 at the two ends of housing 105. Also, several (4 in this embodiment) rotor magnets 107 are arranged at equal intervals in the circumferential direction along the axial direction of rotary shaft 102 on the inner edge of rotor 103.

Stator 104 is fixed on the inner periphery of housing 105. Several (6 in this embodiment) stator projecting polar parts 104S are formed at equal intervals along the circumferential direction on the inner periphery of the stator 104. Coil 108 is wound around each stator projecting polar part 104S.

As shown in FIG. 11, a motor inverter 110 that converts DC power into AC power is arranged outside housing 105 of the motor 101.

As shown in FIG. 14, the motor inverter 110 has a rectangular parallelepiped shaped main body 111 composed of 6 surfaces 111a-111f. A plurality of electronic elements 112 for controlling the inverter, such as thyristor elements, are arranged on the top surface 111c of main body 111.

The motor 101 is cooled by cooling apparatus 120. The cooling apparatus 120 includes a coolant path 121 arranged on the hot areas, such as coil 108 of motor 101 or the bus bar (not shown in the figure), as shown in FIGS. 11, 13 and containing a coolant, which changes from the liquid phase to the vapor phase at a prescribed temperature, flowing through it. A reservoir tank 122 is arranged above the coolant path 121 and supplies the coolant into coolant path 121 while inhibiting backflow of the coolant. A condenser 124 is arranged in coolant return path 123 that returns the coolant discharged from the coolant path 121 to the reservoir tank 122 to liquefy the vapor-phase coolant in the coolant path 121. A motor inverter 110 is used as a pressurization means, which further increases the discharge pressure of the coolant path 121 in the coolant return path 123 from coolant path 121 to reservoir tank 122.

The motor inverter 110 forms inverter coolant path 113 that guides the coolant from the reservoir tank 122 while preventing backflow of the coolant with check valve 129, as shown in FIGS. 14, 15. The coolant exit 113b out of the inverter coolant path 113 is connected to coolant return path 123 from the coolant path 121 to the reservoir tank 122.

In particular, in this embodiment, the coolant exit 113b out of the inverter coolant path 113 is connected to the upstream side of coolant return path 123 with respect to the condenser 124.

The coolant path 121 is comprised of a plurality of internal stator passages 121a-121f formed along the axial direction of rotary shaft 102 around the outer periphery of stator 4, as shown in FIG. 11. The internal stator passages 121a-121f are formed in six locations at approximately equal intervals in the circumferential direction corresponding to the positions of stator projecting polar parts 104S, as shown in FIG. 13.

For the plurality of internal stator passages 121a-121f, as shown in FIG. 13, internal stator path 121a is arranged at the highest position of stator 104, while the rest of internal stator passages 121b-121f are arranged at equal intervals in the counterclockwise direction. Consequently, internal stator path 121d is arranged at the lowest position of stator 104.

As shown in FIG. 11, the internal stator passages 121a-121f are connected on the coolant inlet side (right side in the figure) by a first annular path 105a formed inside end plate 105e1 of housing 105, and the internal stator passages are connected on the coolant outlet side (left side in the figure) by a second annular path 105b formed inside end plate 105e2 of housing 105.

Air opening 122a is formed at the top of the reservoir tank 122 arranged above the coolant path 121. A first inlet path 125 is formed with one end 125a connected to the lower side surface of the reservoir tank 122. The other end 125b of the first inlet path 125 is connected to the first annular path 105a via check valve 126.

The second annular path 105b is connected to one end 123a of the coolant return path 123, and the other end 123b of coolant return path 123 is connected to the upper side surface of the reservoir tank 122 after passing through the condenser 124.

Check valve 127 is installed on the downstream side of condenser 124 to prevent the coolant from flowing into condenser 124 from the side of reservoir tank 122.

As shown in the figure, the condenser 124 is a single straight pipe with fins arranged on it. However, it is also possible to use several straight pipes or coiled pipes instead of one straight pipe.

The reservoir tank 122 is arranged separately from and above motor 101. In this embodiment, as shown in FIG. 10, when motor 101 is an in-wheel drive motor, the reservoir tank 122 can be installed on the rear side member that acts as a frame on both sides in the rear part of the vehicle body.

The second inlet path 128 is arranged with one end 128a connected to the bottom of reservoir tank 122. The other end 128b of the second inlet path 128 is connected to the coolant inlet pipe 113a of the invert coolant path 113 via check valve 129.

Inverter coolant path 113 is formed in the main body 111 of the motor inverter 110. The coolant inlet pipe 113a is arranged at one end surface 111a in the length direction of main body 111 formed with a rectangular parallelepiped shape, and coolant outlet pipe 113b is arranged at the other end surface 111b in the length direction of main body 111. The end of coolant outlet pipe 113b becomes the coolant exit 113out.

The inverter coolant path 113 has a rectangular cross section and is formed by top and bottom surfaces 111c, 111e and left and right side surfaces 111d, 111f of main body 111, as shown in FIG. 15.

In this case, the inverter coolant path 113 is made of a porous material 130.

Consequently, in cooling apparatus 120 disclosed in this embodiment, the coolant in reservoir tank 122 is fed from the first inlet path 125 (flow F101) into the first annular path 105a via check valve 126, as shown in FIG. 12. The coolant fed into the first annular path 105a is distributed into internal stator passages 121a-121f to flow through stator 104 (flow F102).

After passing through the internal stator passages 121a-121f, the coolant flows are combined in the second annular path 105b and then exit to coolant return path 123 (flow F103). After passing through condenser 124 and check valve 127 arranged in the coolant return path 123 (flow F104), the coolant returns to reservoir tank 122.

Also, the coolant in the reservoir tank 122 is fed from the second inlet path 128 (flow F105) into the inverter coolant path 113 of motor inverter 110 via check valve 129. After flowing through the inverter coolant path 113 (flow F106), the coolant flows from coolant exit 113out into the upstream part of the coolant return path 123 (flow F107).

In the method of cooling motor 101 using cooling apparatus 120 with the aforementioned configuration, a coolant, which changes from the liquid phase into the vapor phase at a prescribed temperature, flows through coolant path 121 (121a-121f) arranged in the hot areas of motor 101 to cool the hot areas. The vapor-phase coolant discharged from the coolant path 121 is liquefied by condenser 124 used as a heat dissipating mechanism and returns to reservoir tank 122. When the reservoir tank 122 is arranged directly above the coolant path 121, the coolant can auto-circulate. On the other hand, the discharge pressure of the coolant path 121 is further increased to increase the pressure on the coolant liquefied by the condenser 124 in order to push it into reservoir tank 122.

When using cooling apparatus 120 and its cooling method disclosed in the aforementioned embodiment, the liquid-phase coolant in the reservoir tank 122 arranged above the coolant path is gravity fed from the first inlet path 125 into the first annular path 105a and internal stator passages 121a-121f via check valve 126. When passing through internal stator passages 121a-121f, the liquid-phase coolant is evaporated by the hot areas of motor 101 and expands. These hot areas can be effectively cooled by the vapor phase-converted coolant.

When the coolant changes from the liquid phase to the vapor phase, the pressure in the path generated by the expansion pressure exceeds the pressure of the liquid phase. However, the vapor-phase coolant is prevented from flowing back in the direction of the first annular path 105a by check valve 126.

Consequently, the coolant that has been converted into the vapor phase in internal stator passages 121a-121f is prevented from flowing back to the first annular path 125 by the check valve 126 and is discharged into coolant return path 123 through the second annular path 105b.

The discharged vapor-phase coolant is cooled by condenser 124 arranged in coolant return path 123 so that it can be liquefied. The liquid-phase coolant is prevented from flowing back by check valve 127 arranged on the downstream side of condenser 124 and is pushed out toward the downstream side by the expansion pressure of the vapor-phase coolant on the upstream side of condenser 124.

Since the coolant liquefied by condenser 124 is pressed back into reservoir tank 122 and the coolant is gravity fed from reservoir tank 122 into internal stator passages 121a-121f, as described above, the coolant can auto-circulate through cooling apparatus 120.

Consequently, it is not necessary to use a pump or other coolant moving device in the coolant circulation path so that cooling apparatus 120 can be miniaturized, and the heat of vaporization generated when evaporating the coolant in internal stator passages 121a-121f can be used to cool the hot areas of motor 101 to improve cooling efficiency. Also, the quantity of coolant in internal stator passages 121a-121f can be significantly reduced compared with the case in which liquid-phase coolant is used to cool the motor. The total weight of cooling apparatus 120 can be reduced.

When the size and weight of motor 101 can be reduced, it becomes easier to assemble the in-wheel drive motor in tire (W). When the cooling efficiency of cooling apparatus 120 is increased, the temperature rise of motor 101 can be prevented so that high-load operation can be carried out for longer periods of time.

However, if the expansion pressure is not high enough when the liquid-phase coolant is evaporated in the internal stator passages 121a-121f, the pressure for expelling coolant from coolant return path 123 liquefied by condenser 124 and into reservoir tank 122 will be insufficient. As a result, the coolant might be held up in the circulation path.

Consequently, the liquid-phase coolant cannot be supplied in sufficient amounts from the first inlet path 125 in internal stator passages 121a-121f. The temperature in internal stator passages 121a-121f will then exceed the nominal permitted range, and the so-called dry out problem will occur.

In order to prevent the dry out problem from occurring, it is necessary to actively return to reservoir tank 122 the liquid-phase coolant that is present in condenser 124 or coolant return path 123 on its downstream side.

When the liquid-phase coolant in coolant return path 123 is returned to reservoir tank 122, the pressure in internal stator passages 121a-121f drops, so that check valve 126 can be opened. In this way, the liquid-phase coolant can be supplied from the first inlet path 125 into internal stator passages 121a-121f so that the dry out problem can be avoided.

When the opening/closing state of the check valve 126 was studied, it was found, as shown in FIG. 12, that the pressure Pin at upstream position S101 of the check valve 126 is as follows:

$$Pin = Pt + \rho i \cdot g \cdot Hi \quad [2]$$

Pt is the pressure applied to the liquid level of the coolant in reservoir tank 122. $\rho i$ is the density of the liquid-phase coolant at upstream position S101. g is acceleration due to gravity. Hi is the height from upstream position S101 to the liquid level of the coolant in reservoir tank 122.

On the other hand, the pressure Pout at downstream position S102 of check valve 126 is as follows $$Pout = Pt + \Delta Pls + \rho o \cdot g \cdot Ho \quad [3]$$

$\rho o$ is the density of the liquid-phase coolant in the downstream part of condenser 124 of coolant return path 123. Ho is the height from downstream position S10 to the position where coolant return path 123 is connected to reservoir tank 122. $\Delta Pls$ is the resistance pressure in the path.

Consequently, if the resistance of the check valve 126 is ignored and if Pin>Pout, that is, $\rho i \cdot g \cdot Hi > = \Delta Pls + \rho o \cdot g \cdot Ho$, check valve 126 is open. If Pin<Pout, the valve is closed.

In this case, if the coolant is water and the water temperature at upstream position S101 and the water temperature on the downstream side of coolant return path 123 is assumed to be 50° C. and Hi is 0.5 m and Ho is 0.6 m, the following can be obtained.

$$\rho i \cdot g \cdot Hi = 988 \times 9.8 \times 0.5 = 4.84 \text{ kPa (kN/m}^2\text{)}$$

$$\rho o \cdot g \cdot Ho = 988 \times 9.8 \times 0.6 = 5.81 \text{ kPa (kN/m}^2\text{)}$$

In this case, if Pt is the standard atmospheric pressure (101.3 kPa), $Pt + \rho o \cdot g \cdot Ho = 107.1$ kPa. The saturation temperature with respect to a saturation pressure for water of 107.1 kPa is 101.3° C. Experimental results showed that the saturation temperature is about 102° C. According to the saturated steam table for water, the saturation pressure with respect to a saturation temperature of 102° C. is 109.6 kPa.

Based on these results, $\Delta Pls = 109.6 - 107.1 = 2.5$ kPa, and $\Delta Pls$ takes on a value with the same order of magnitude as $\rho o \cdot g \cdot Ho$.

If the liquid-phase coolant in coolant return path 123 returning from condenser 124 to reservoir tank 122 is fed into reservoir tank 122 by using an external heat source, Pin≧Pout can be realized so that check valve 26 is open even during dryout.

Consequently, in this embodiment, motor inverter 110 is used to supply the liquid-phase coolant from reservoir tank 122 via the second inlet path 128 into inverter coolant path 113 formed in the motor inverter 110. The pressure of the vapor-phase coolant in the inverter coolant path 113 is used to forcibly return the liquid-phase coolant in coolant return path 123 to reservoir tank 122.

In other words, the heat generated by electronic elements 112 arranged on the top surface 111c of main body 11 as shown in FIGS. 14, 15 is transferred to the liquid-phase coolant fed from the second inlet path 128 into inverter coolant path 113 via check valve 129 to evaporate and expand the coolant. The expansion pressure in coolant outlet pipe 113b is supplied to the upstream side of coolant return path 123 connected to coolant exit 113out.

At that time, since the pressure in the inverter coolant path 113 acts on the upstream side of coolant return path 123 with respect to condenser 124 in addition to the pressure of internal stator passages 121a-121f, a high pressure is generated at the upstream side of condenser 124, so that the liquid-phase coolant in coolant return path 123 can be forcibly returned to reservoir tank 122 by the high pressure.

Consequently, the coolant circulation efficiency can be further improved, and the dry out problem can be avoided. Therefore, the cooling efficiency of motor 101 can be improved, and motor inverter 110 can also be cooled by flowing the coolant in inverter coolant path 113.

Also, the motor inverter 110 is used to provide a pressurization means. Since the motor inverter 110 already exists in the apparatus, there is no need to use a separate pressurization means. Therefore, a significant cost increase can be avoided. In addition, in this embodiment, the inverter coolant path 113 is made of a porous material 130, and the heat conducting area in inverter coolant path 113 can be increased. Consequently, the heat generated by electronic elements 112 can be easily conducted to the coolant through the porous material 130.

Moreover, since the flow resistance of the coolant flowing through the porous material 130 is increased, the pressure in inverter coolant path 113 exceeds the pressure in internal stator passages 121a-121f, and a higher pressure can be generated. The pressure on the upstream side of coolant return path 123 with respect to condenser 124 is further increased so that the liquid-phase coolant in coolant return path 123 can be returned to reservoir tank 122 more reliably.

Figure 16:
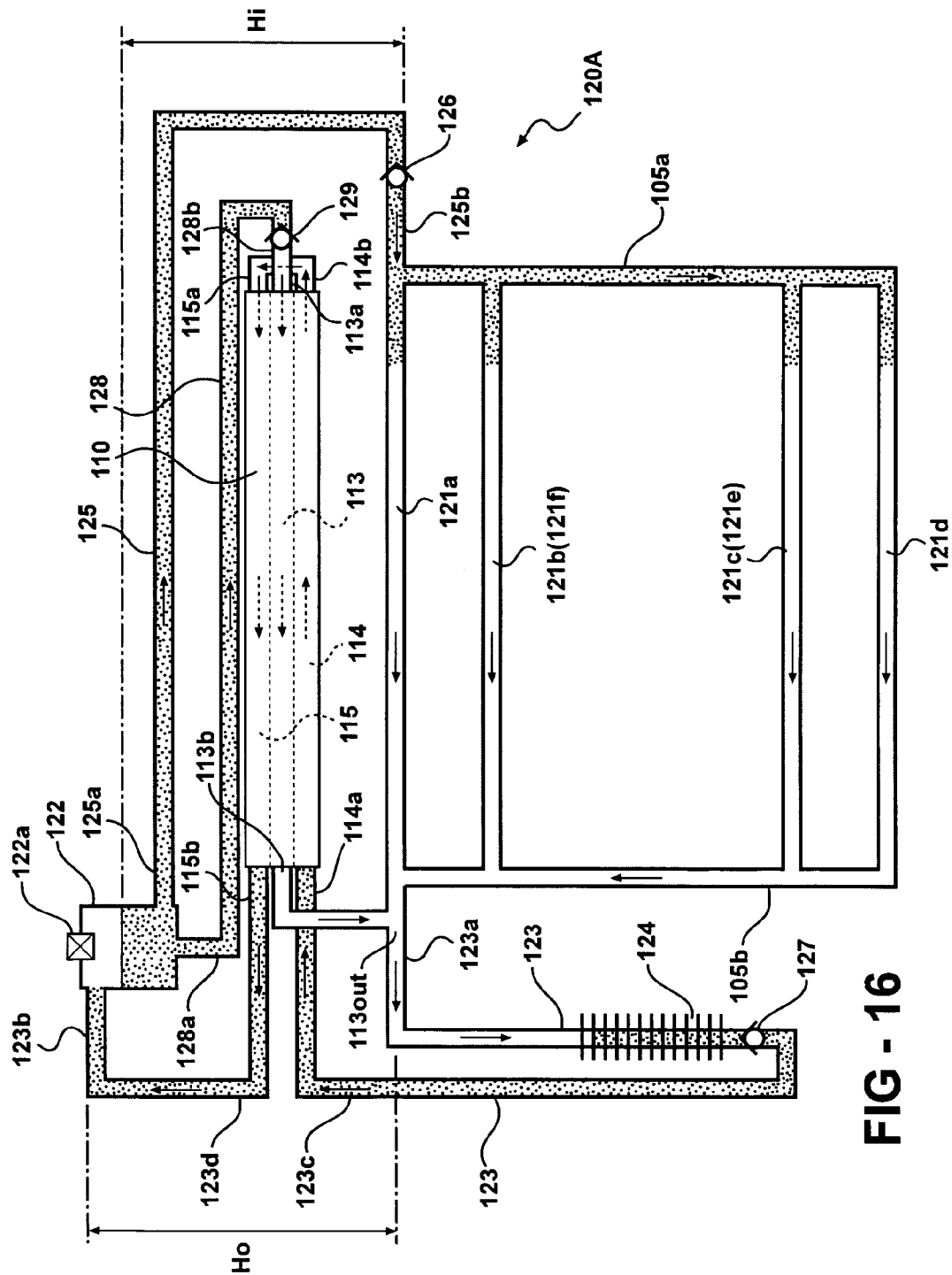
FIG. 16 is a schematic diagram of the coolant circulation path in a cooling device according to a seventh embodiment of the invention.
Figure 17:
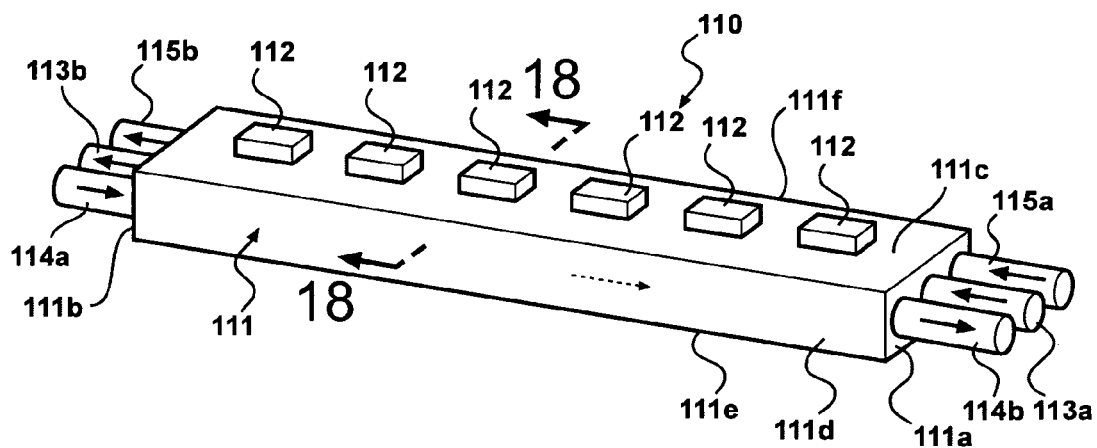
FIG. 17 is an enlarged perspective view of the motor inverter shown in FIG. 16.
Figure 18:
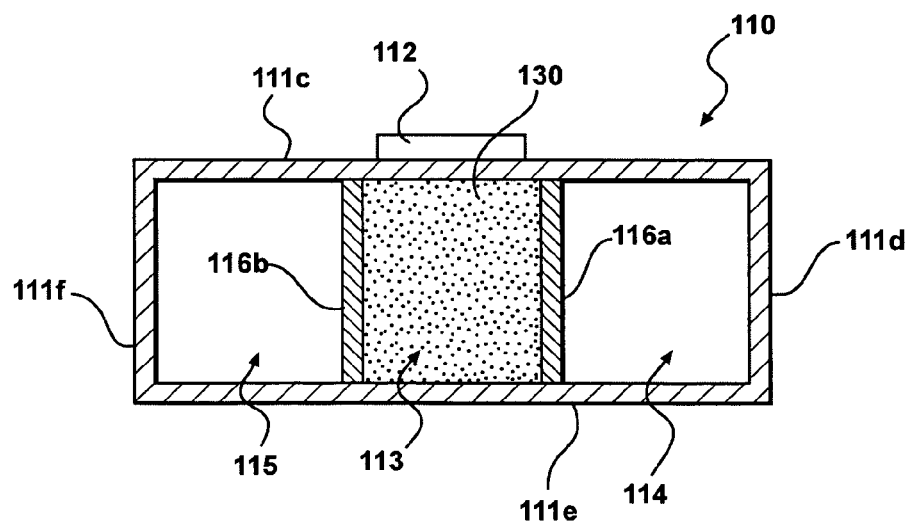
FIG. 18 is an enlarged cross-sectional view of the motor inverter, taken on the line 18-18 in FIG. 17.

FIGS. 16-18 show the seventh embodiment. The same parts as those in the sixth embodiment are represented by the same symbols, respectively, and will not be explained again. FIG. 16 is an overall diagram illustrating the coolant circulation path of the cooling apparatus. FIG. 17 is an enlarged oblique diagram of the motor inverter. FIG. 18 is an enlarged cross section along line 18-18 in FIG. 17.

Cooling apparatus 120 disclosed in this embodiment basically has the same configuration as cooling apparatus 120 disclosed in the sixth embodiment. Motor inverter 10 is used to constitute a pressurization means. The liquid-phase coolant is supplied from reservoir tank 122 via the second inlet path 128 to inverter coolant path 113 formed in the motor inverter 110. The pressure of the vapor-phase coolant in the inverter coolant path 113 is used to increase the pressure on the upstream side of coolant return path 123.

In this embodiment, two coolant paths, that is, the first and second secondary paths 114, 115, through which the coolant flows, are arranged close to the inverter coolant path 113 in the motor inverter 110.

In other words, in the motor inverter 110, a plurality of electronic elements 112 used to control the inverter are arranged on the top surface 111c of the rectangular parallelepiped shaped main body 111 comprised of six surfaces 111a-111f in the same way as described in the first embodiment as shown in FIG. 17. As shown in FIG. 18, the first and second secondary coolant paths 114, 115 are divided by partition walls 116a, 116b on both sides of the inverter coolant path 113.

The first and second secondary coolant paths 114, 115 are also formed as passages with the same rectangular cross section as inverter coolant path 113. The secondary coolant paths 114, 115 are hollow.

For the inverter coolant path 113, as shown in FIG. 16, the second inlet path 128 is connected to coolant inlet pipe 113a, and the coolant exit 113out at the top of coolant outlet pipe 113b is connected to the upstream side of coolant return path 123 with respect to condenser 124 in the same way as described in the sixth embodiment. In this embodiment, the inverter coolant path 113 is also made of porous material 130.

For the first secondary coolant path 114, coolant inlet pipe 114a is arranged on the side of inverter coolant path 113 where coolant outlet pipe 113b is arranged (left side of FIG. 17), and coolant outlet pipe 114b is arranged on the side of inverter coolant path 113 where coolant inlet pipe 113a is arranged (right side of FIG. 17). Also, for the second secondary coolant path 115, coolant inlet pipe 115a is arranged on the side of inverter coolant path 113 where coolant outlet pipe 114b is arranged (left side of FIG. 17), and coolant outlet pipe 115b is arranged on the side of inverter coolant path 113 where coolant inlet pipe 114a is arranged (right side of FIG. 17).

The coolant outlet pipe 114b of the first secondary coolant path 114 and the coolant inlet pipe 115a of the second secondary coolant path 115 are connected to each other as shown in FIG. 16.

On the other hand, the coolant return path 123 is divided on its downstream side with respect to check valve 127. The divided return path 123c on the upstream side is connected to the coolant inlet pipe 114a of the first secondary coolant path 114, and the divided return path 123d on the downstream side is connected to the coolant outlet pipe 1115b of the second secondary coolant path 115.

When motor cooling apparatus 120A disclosed in this embodiment is used, the coolant is fed from the second inlet path 128 into the inverter coolant path 113 of motor inverter 110 in the same way as described in the first embodiment.

When the high pressure coolant generated by the porous material 130 of inverter coolant path 113 is supplied to the upstream side of coolant return path 123, the coolant circulation efficiency can be increased, and the dry out problem can be prevented in internal stator passages 121a 121f. In this case, however, it is necessary to adjust the diameter of inverter coolant path 113 and the diameter of coolant inlet/outlet 113a, 113b on either side, so that a high pressure vapor is generated in inverter coolant path 113.

In some cases, however, the function of removing heat from plural electronic elements 112 may not be realized under the conditions of evaporating the coolant in the inverter coolant path 113. In this embodiment, two coolant paths, that is, the first and second secondary passages 114, 115 through which the coolant flows, are arranged close to the inverter coolant path 113 in the motor inverter 110. After the liquid-phase coolant returning to reservoir tank 122 from coolant return path 123 is fed into the first secondary coolant path 114, the coolant flows into the second secondary coolant path 115 and then returns to the reservoir tank 122.

When the coolant returning to reservoir tank 122 circulates in the first and second secondary coolant paths 114, 115 as described above, motor inverter 110 can be cooled. Therefore, inverter coolant path 113, which is made of porous material 130, can be constituted appropriately to accelerate evaporation of the coolant, and the function of removing heat from electronic elements 112 can be guaranteed by the liquid-phase coolant flowing in the first and second secondary coolant paths 114, 115.

Consequently, the drying out of the hot areas of motor 101 can be avoided, and the cooling of electronic elements 112 in motor inverter 110 can also guarantee the heat removal function over a wider range. In addition, drying out can be prevented even if forces other than gravity are applied to the vehicle when the vehicle travels on hilly roads or is accelerated.

Figure 19:
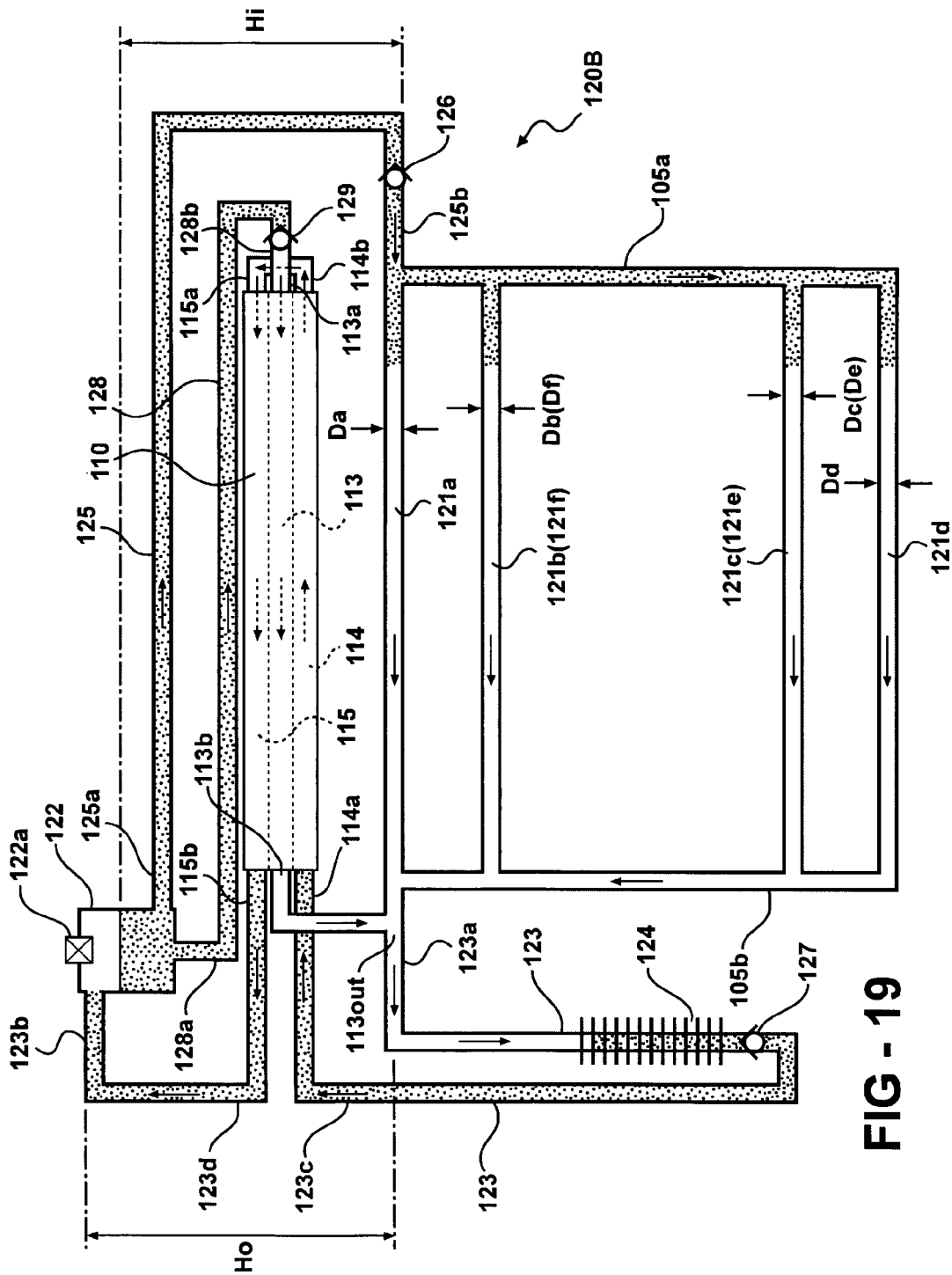
FIG. 19 is a schematic diagram illustrating the coolant circulation path in a cooling device according to an eighth embodiment of the present invention.

FIG. 19 shows the eighth embodiment of the present invention. The same parts as those in the aforementioned embodiments are represented by the same symbols, respectively, and will not be explained again. FIG. 19 is an overall diagram illustrating the coolant circulation path of the cooling apparatus.

Cooling apparatus 120B disclosed in this embodiment basically has the same configuration as cooling apparatus 120 disclosed in the sixth embodiment. Coolant path 121 is constituted by a plurality of internal stator passages 121a-121f formed in the axial direction of rotary shaft 102 on the outer periphery of stator 104 as shown in FIG. 13. After the coolant fed from the first inlet path 125 flows through internal stator passages 121a-121f, it is discharged to coolant return path 123.

Besides inverter coolant path 113, the first and second secondary coolant paths 114, 115 are arranged in motor inverter 110 in the same way as described in the seventh embodiment. The liquid-phase coolant returning from coolant return path 123 to reservoir tank 122 flows through the first and second secondary coolant paths 114, 115.

In this embodiment, a coolant quantity equalization means is used to approximately equalize the quantity of the coolant in the plurality of internal stator passages 121a-121f corresponding to the height (water head) from the liquid level of reservoir tank 122.

In other words, if the diameters Da Df of the internal stator passages 121a-121f are the same, due to the effect of the water head position from the liquid level of reservoir tank 122, the higher the height (water head) with respect to the liquid level, the easier the coolant can flow. Therefore, a difference may occur in the dry out situation depending on the positions of internal stator passages 121a-121f in the vertical direction.

Consequently, in this embodiment, the coolant quantity equalization means is constituted by reducing the diameters Da Df of internal stator passages 121a-121f as the height (water head) with respect to the liquid level in reservoir tank 122 is increased.

For the internal stator passages 121a-121f, as shown in FIG. 13, internal stator path 121a is arranged at the highest position in stator 104, and internal stator path 121d is arranged at the lowest position in stator 104. Internal stator passages 121b, 121f are arranged at the top in the area between internal stator passages 121a, 121d. Internal stator passages 121c, 121e are arranged at the bottom in the area between internal stator passages 121a, 121d.

Consequently, and referring again to FIG. 19. the internal stator passages 121a-121f are formed such that their diameters Da-Df have the following relationship. Da>(Db=Df)>(Dc=De)>Dd.

In cooling apparatus 110B disclosed in this embodiment is used, since the diameters Da Df of internal stator passages 121a-121f are decreased as the height (water head) with respect to the liquid level in reservoir tank 122 is increased, the quantities of the coolant flowing in internal stator passages 121a-121f can be approximately equalized.

Consequently, since the heat removal states of the plurality of internal stator passages 121a-121f are approximately equalized, differences in the respective dry out situations can be prevented from occurring, so that the control for solving the dry out problem can be carried out easily.

In this embodiment, the quantities of coolant are approximately equalized by varying the diameters Da-Df of internal stator passages 121a-121f. This purpose can also be realized by forming orifices that satisfy the aforementioned relationship in internal stator passages 121a-121f.

Figure 20:
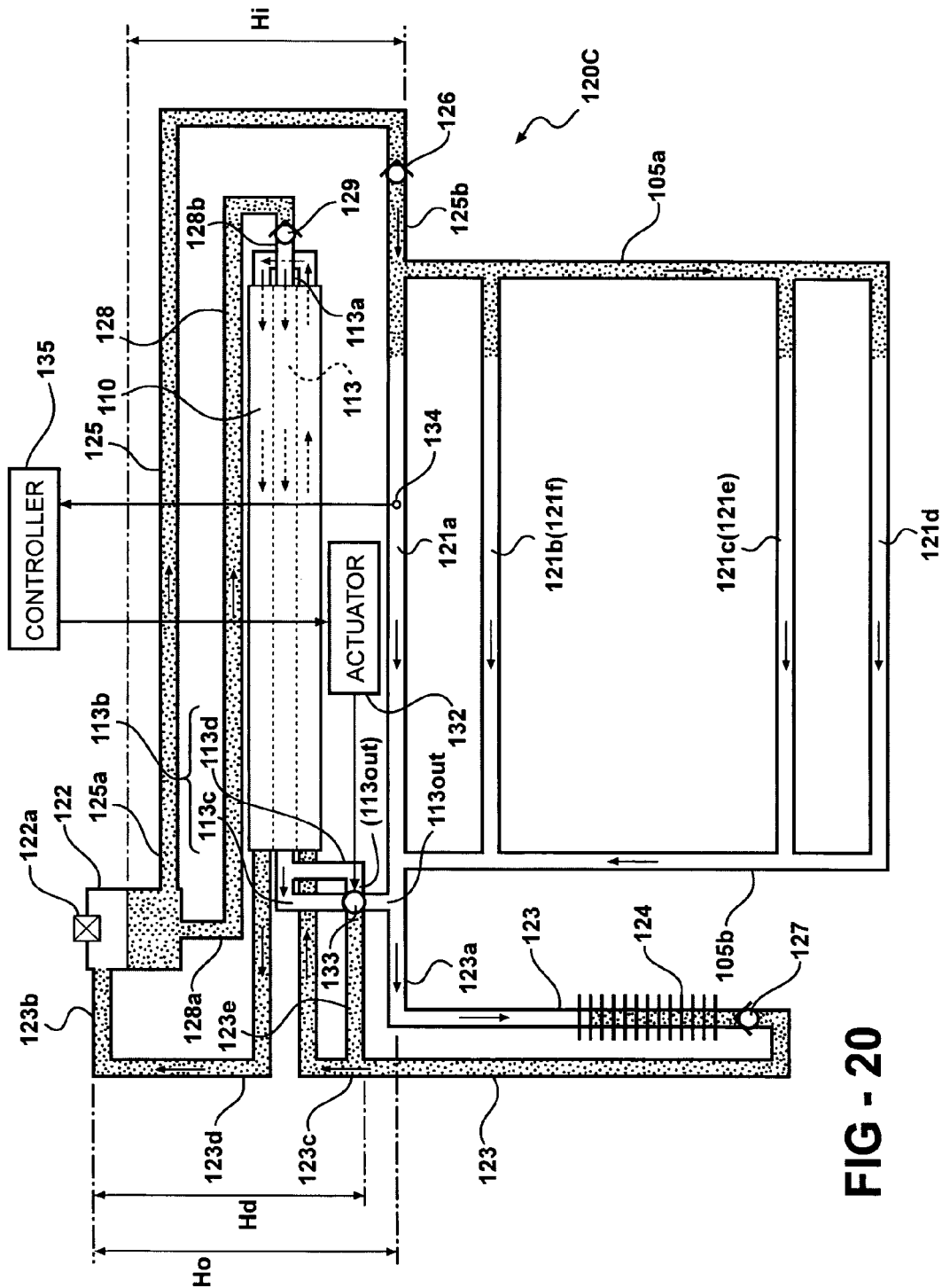
FIG. 20 is a schematic diagram of the coolant circulation path in a cooling device according to a ninth embodiment of the invention.
Figure 21A:
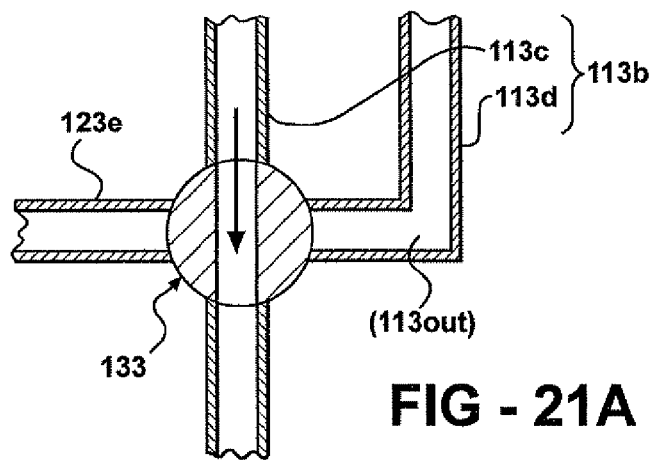
FIG. 21A is a schematic diagram illustrating a first switching operation of the cooling device shown in FIG. 20 according to the ninth embodiment of the invention.
Figure 21B:
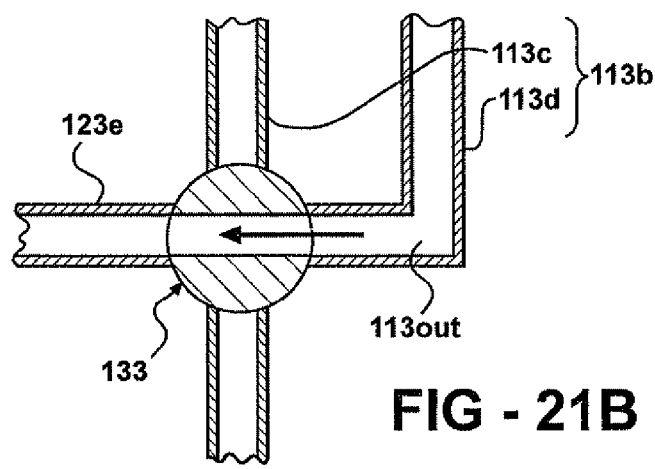
FIG. 21B is a schematic diagram illustrating a second switching operation of the cooling device shown in FIG. 20 according to the ninth embodiment of the invention.

FIGS. 20 and 21 show the ninth embodiment of the present invention. The same parts as those in the aforementioned embodiments are represented by the same symbols, respectively, and will not be explained again. FIG. 20 is an overall configuration diagram illustrating the coolant circulation path of the cooling apparatus. FIGS. 21A and 21B are diagrams explaining the switching state of the switch valve on the discharge side of the inverter coolant path.

As shown in FIG. 20, cooling apparatus 120C disclosed in this embodiment basically has the same configuration as cooling apparatus 120 disclosed in the sixth embodiment. Motor inverter 110 is used to constitute the pressurization means. Also, besides inverter coolant path 113, the first and second secondary coolant paths 114, 115, through which the liquid-phase coolant returning from coolant return path 123 to reservoir tank 122 flows, are arranged in motor inverter 110 in the same way as described in the seventh embodiment.

In this embodiment, when the temperature of the coolant through coolant path 121 is higher than a prescribed level, the coolant exit 113 out of the inverter coolant path 113 is connected to the downstream side of the coolant return path 123 with respect to condenser 124.

Also, in this embodiment, the coolant outlet pipe 113b of the inverter coolant path 113 is divided into primary outlet pipe 113c and secondary outlet pipe 113d. The coolant exit 113out formed at the end of the main outlet pipe 113c is connected to the upstream side of coolant return path 123 with respect to condenser 124 in the same way as described in the first embodiment.

A branch path 123e connected to the secondary outlet pipe 113d is arranged on the downstream side of coolant return path 123 with respect to condenser 124. The branch path 123e crosses the primary outlet pipe 113c. A switching valve 133 is used in the crossing part to switch the connection state of primary outlet pipe 113c shown in FIG. 21A and the connection state of branch path 123e and secondary outlet pipe 113d shown in FIG. 21B by using actuator 132.

On the other hand, a temperature sensor 134 is arranged in coolant path 121 (internal stator path 121a). The signal detected by this temperature sensor 134 is output to controller 135, and the switching timing of the switching valve 133 is calculated. The calculation result is output to actuator 132 to switch and control switching valve 133.

In other words, the switching valve 133 shuts off the branch path 123e when primary outlet pipe 113c is connected as shown in FIG. 21A and shuts off primary outlet pipe 113c when branch path 123e and secondary outlet pipe 113d are connected as shown in FIG. 21B.

When primary outlet pipe 113c is connected, the end of primary outlet pipe 113c becomes coolant exit 113out in the same way as described in the aforementioned embodiments. The coolant exit 113out is connected to the upstream side of coolant return path 123 with respect to condenser 124. When branch path 123e and secondary outlet pipe 113d are connected, the top of secondary outlet pipe 113d becomes coolant exit 113out. The coolant exit 113out is connected to the branch path 123e.

When the temperature (T) detected by temperature sensor 134 is lower than the preset level Td(T<Td), the switching valve 133 is in the state shown in FIG. 21A. When the detected temperature (T) is the same as or above the preset level Td(T≧Td), the switching valve 133 is in the state shown in FIG. 21B.

Preset temperature Td is the same as or higher than the saturation temperature Tsat in coolant path 121 derived experimentally (Td≧Tsat), and if the allowed temperature of motor 1 is Tm, Td=α·Td (α<1). For example, when α=0.8, if T≧Td, coolant path 121 is in the dry out state, and the temperature of motor 101 reaches a dangerous temperature range.

When cooling apparatus 130C disclosed in this embodiment with the aforementioned configuration is used, if T<Td, it means that the temperature is below the dangerous temperature range. The switching valve 133 connects primary outlet pipe 113c as shown in FIG. 21A so that the cooling apparatus operates in the same way as cooling apparatus 120A described in the seventh embodiment, and the effects are the same as those of the seventh embodiment.

On the other hand, if T≧Td, it means that temperature is within the dangerous temperature range. Switching valve 133 connects branch path 123e and secondary outlet pipe 113d as shown in FIG. 21B.

In that case, the high-pressure vapor-phase coolant generated in inverter coolant path 113 is supplied from branch path 123e to return path 123c on the upstream side to expel the liquid-phase coolant from coolant return path 123 and into reservoir tank 122.

Since the high-pressure coolant in inverter coolant path 113 is supplied to the downstream side of coolant return path 123 with respect to condenser 124, the liquid-phase coolant in return path 123 can be sent to reservoir tank 122 at lower pressure without the flow resistance of condenser 124.

In other words, when the height (Hd) from the position where branch path 123e branches off from coolant return path 123 to the position where coolant return path 123e is connected to reservoir tank 122 is set to be lower than height (Ho) (see FIG. 12) from the downstream position S102 of check valve 126 to the position where coolant return path 123 is connected to reservoir tank 122, the water head position will be reduced by ρo·g·(Ho−Hd.) Therefore, the liquid-phase coolant in coolant return path 123 returning to reservoir tank 122 can be expelled even at low pressure without the flow resistance of the condenser 124.

In this embodiment, the branch path 123e is branched from return path 123c on the upstream side. However, the same effect can be realized by branching branch path 123e from return path 123d on the downstream side.

Also, this embodiment discloses a case of application to cooling apparatus 110A disclosed in the second embodiment, that is, cooling apparatus 110A, in which the first and second secondary coolant paths 114, 115 are arranged in motor inverter 110 and upstream return path 123c and downstream return path 123d of coolant return path 123 are connected to the secondary coolant paths 114, 115. However, it is also applicable to the sixth embodiment without first or second secondary coolant paths 114, 115 arranged in motor inverter 110.

Figure 23A:
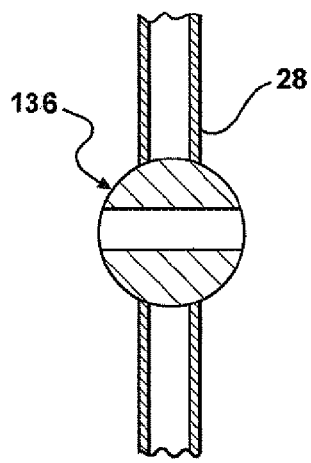
FIG. 23A is schematic diagram illustrating the cooling device of FIG. 22 with a valve in the closed position in the coolant supply path to the inverter.
Figure 23B:
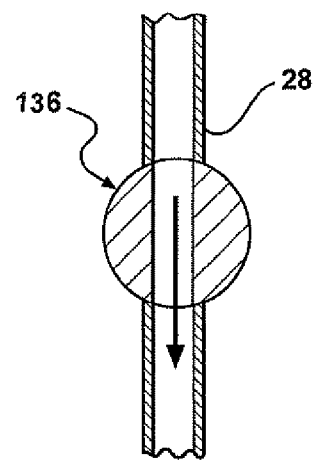
FIG. 23B is schematic diagram illustrating the cooling device of FIG. 22 with a valve in the open position in the coolant supply path to the inverter.
Figure 22:
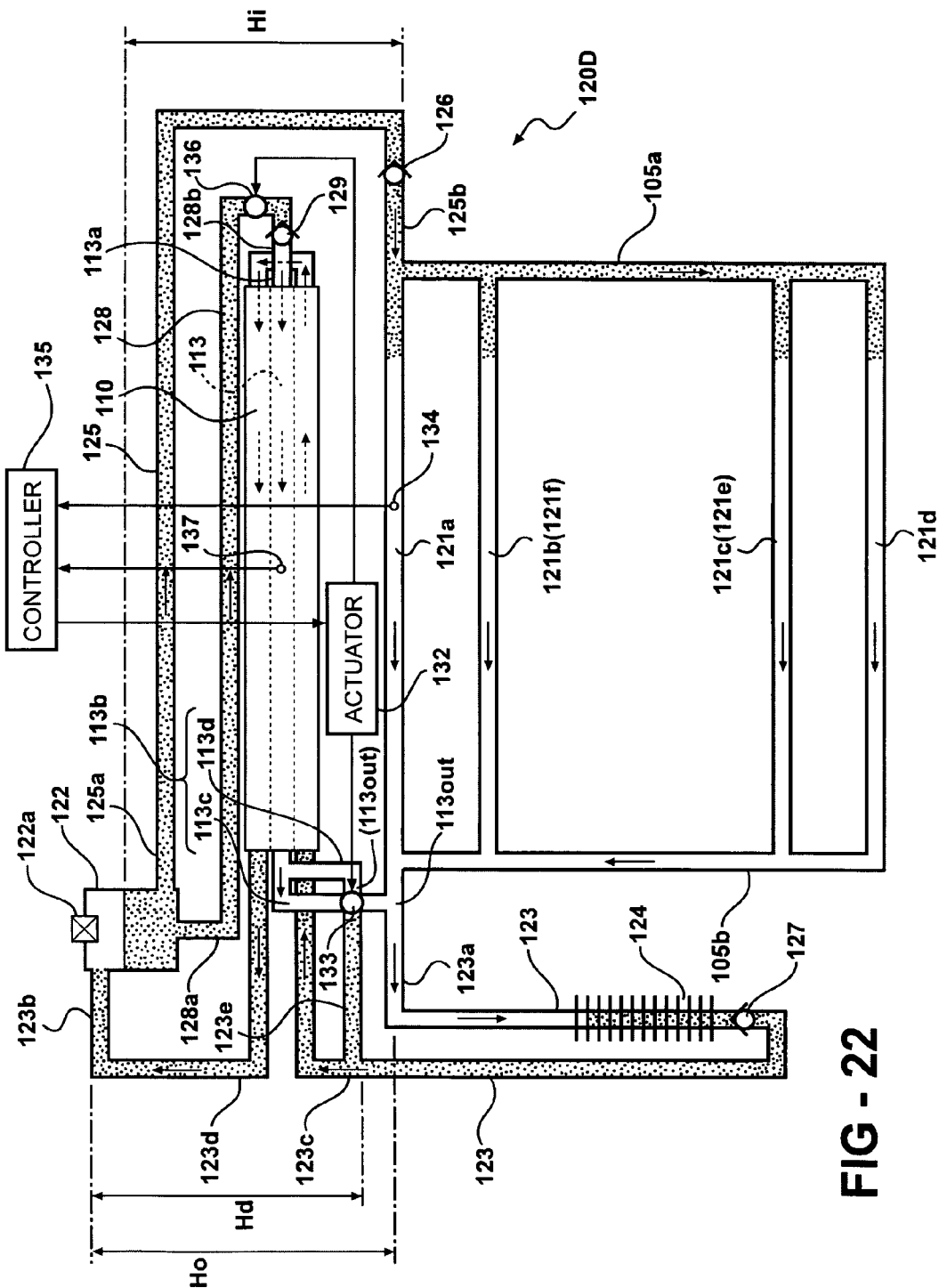
FIG. 22 is a schematic diagram illustrating the coolant circulation path of the cooling device according to a tenth embodiment of the invention.

FIGS. 22, 23A and 23B show the tenth embodiment of the present invention. The same parts as those in the ninth embodiment are represented by the same symbols, respectively, and will not be explained again. FIG. 22 is an overall diagram illustrating the coolant circulation path of the cooling apparatus. FIGS. 23A and 23B are diagrams explaining the switching state of a valve that closes/opens, respectively, the coolant supply path.

As shown in FIG. 22, cooling apparatus 120D disclosed in this embodiment basically has the same configuration as cooling apparatus 120C disclosed in the ninth embodiment. The coolant outlet pipe 113b of inverter coolant path 113 is divided into two paths, that is, primary outlet pipe 113c and secondary outlet pipe 113d. The valve 133 set at the part where primary outlet pipe 113c and the branch path 123e of coolant return path 123 is switched via temperature sensor 134, controller 135 and actuator 132 arranged in coolant path 121.

The coolant in reservoir tank 122 is fed into inverter coolant path 113 via the second inlet path 128. In this case, however, if a large amount of liquid-phase coolant is present in inverter coolant path 113, the vapor-phase coolant in inverter coolant path 113 immediately returns to the liquid phase, which might cause the so-called sub-cooling phenomenon.

In this embodiment, as shown in FIG. 22, an opening/closing valve 136 is used as a coolant quantity control means, which reduces the quantity of coolant fed from reservoir tank 122 into inverter coolant path 113 when the temperature in inverter coolant path 113 is low and increases the quantity of coolant when the temperature in inverter coolant path 113 is high.

The opening/closing valve 136 is installed on the upstream side of the second inlet path 128, which feeds the coolant in reservoir tank 122 into inverter coolant path 113, with respect to check valve 129. The opening/closing of the valve is controlled by the actuator 132.

The switching of the opening/closing valve 136 is controlled by inputting the signal detected by temperature sensor 137 arranged in inverter coolant path 113 to controller 135 in order to calculate the switching timing and outputting the calculation result to the actuator 132.

When the temperature T1 in inverter coolant path 113 is below a preset level Td1 (T<Td1), switching valve 136 is closed as shown in FIG. 23A to shut off the second inlet path 128. On the other hand, if the temperature (T1) is the same as or higher than the level Td1 (T1≧Td1), switching valve 36 is opened as shown in FIG. 23B to connect the second inlet path 128 so that the liquid-phase coolant in inverter coolant path 113 can be fed through that path.

In this case, Td1 is greater than or equal to saturation temperature Tsat (Td1≧Tsat1) in inverter coolant path 113 predetermined experimentally.

In cooling apparatus 110D disclosed in this embodiment with the aforementioned configuration, when the temperature in inverter coolant path 113 is low, valve 136 is closed to reduce the quantity of the coolant supplied to inverter coolant path 113. On the other hand, if the temperature in inverter coolant path 113 is high, valve 136 is opened to increase the quantity of the coolant supplied to inverter coolant path 113. In this way, the coolant in inverter coolant path 113 can be reliably evaporated to increase the coolant pressure so that the dry out phenomenon in inverter coolant path 113 can be prevented.

Of course, cooling apparatus 110D disclosed in this embodiment is also applicable to cooling apparatus 120 disclosed in the sixth embodiment without first or second secondary coolant path 114, 115 arranged in motor inverter 110.

Other embodiments are also possible without deviating from the essence of the present invention. For example, the motor is not limited to an in-wheel drive motor used in electric automobiles. It is also possible to apply the present invention to conventional motors.

This application is based on Japanese Patent Application No. 2004-346024 filed Nov. 30, 2004 in the Japanese Patent Office, the entire contents of which are hereby incorporated by reference, and on Japanese Patent Application No. 2005-210075 filed Jul. 20, 2005 in the Japanese Patent Office, the entire contents of which are hereby incorporated by reference, The above-mentioned embodiments have been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cooling apparatus for a motor having a rotary shaft, a rotor coupled to the rotary shaft, and a stator surrounding the outer periphery of the rotor, the cooling apparatus comprising:
   (a) an inner coolant path disposed in association with hot areas of the motor, the coolant path having at least one inlet and one outlet and coolant flowing therebetween;
   (b) a reservoir tank adapted to store coolant and having an inlet and an outlet, the inlet and the outlet of the reservoir tank positioned above the inner coolant path;
   (c) a coolant supply path that connects the outlet of the reservoir tank to at least one inlet of the inner coolant path;
   (d) a coolant return path that connects at least one outlet of the inner coolant path to the inlet of the reservoir tank;
   (e) at least one valve interposed between the coolant supply path and at least one inlet of the inner coolant path to stop the backflow of coolant toward the coolant supply path from the inner coolant path; and
   (f) a first heat-dissipating mechanism disposed in association with the coolant return path to dissipate the heat of the coolant in the coolant return path.

2. The cooling apparatus of claim 1, wherein the inner coolant path further comprises a rotor inner path having a rotor inlet and a rotor outlet and being disposed in association with the rotor, and a stator inner path having a stator inlet and a stator outlet and being disposed in association with the stator.

3. The cooling apparatus of claim 2, wherein the rotor inlet is disposed in a central portion of the rotor and at least a first portion of the rotor inner path is disposed in an outer peripheral portion of the rotor, and a second portion of the rotor inner path branches in a radial direction from the rotor inlet to the first portion of the rotor inner path.

4. A cooling apparatus for a motor having a rotary shaft, a rotor coupled to the rotary shaft, and a stator surrounding the outer periphery of the rotor, the cooling apparatus comprising:
   (a) an inner coolant path disposed in association with hot areas of the motor, the coolant path having at least one inlet and one outlet and coolant flowing therebetween;
   (b) a reservoir tank adapted to store coolant and having an inlet and an outlet, the reservoir positioned above the inner coolant path;
   (c) a coolant supply path that connects the outlet of the reservoir tank to at least one inlet of the inner coolant path;
   (d) a coolant return path that connects at least one outlet of the inner coolant path to the inlet of the reservoir tank;
   (e) at least one valve interposed between the coolant supply path and at least one inlet of the inner coolant path to stop the backflow of coolant toward the coolant supply path from the inner coolant path;
   (f) a first heat-dissipating mechanism disposed in association with the coolant return path to dissipate the heat of the coolant in the coolant return path;
   a primary chamber in fluid communication with the coolant return path and having a cross sectional area larger than the cross sectional area of the coolant return path, wherein the primary chamber is positioned upstream from and in fluid communication with the first heat-dissipating mechanism; and
   a valve disposed between the chamber and the first heat-dissipating mechanism to stop the flow of coolant toward the primary chamber from the first heat-dissipating mechanism.

5. The cooling apparatus of claim 4, wherein the inner coolant path further comprises a rotor inner path having a rotor inlet and a rotor outlet and being disposed in association with the rotor, and the apparatus further comprising:
   a secondary chamber in fluid communication with the coolant return path and having a cross sectional area larger than the cross sectional area of the coolant return path, wherein the secondary chamber is disposed between the primary chamber and the rotor outlet.

6. The cooling apparatus of claim 4, further comprising:
   an accumulator having a fluid connection with the primary chamber and disposed to absorb variations in pressure in the primary chamber.

7. The cooling apparatus of claim 6, wherein the fluid connection between the primary chamber and the accumulator comprises at least one connection path adapted to prevent coolant flow from the accumulator to the chamber and at least one connection path adapted to permit coolant flow to and from the accumulator and the chamber.

8. The cooling apparatus of claim 1, further comprising:
   a primary chamber in fluid communication with the coolant return path and having a cross sectional area larger than the cross sectional area of the coolant return path;
   a second heat dissipating mechanism disposed in association with the coolant return path to dissipate the heat of the coolant in the coolant return path, wherein the primary chamber includes an upper connection to the second heat dissipating mechanism and a lower connection to the first heat dissipating mechanism, the lower connection being positioned within the primary chamber at a lower vertical level than the upper connection; wherein the coolant flow resistance of the first heat dissipating mechanism is greater than the coolant flow resistance of the second heat dissipating mechanism; and a valve interposed between the primary chamber and the first heat dissipation mechanism to stop the backflow of coolant from the first heat dissipating mechanism to the primary chamber.

9. The cooling apparatus of claim 1, wherein the first heat dissipating mechanism is located above the level of coolant stored in the reservoir tank.

10. The cooling apparatus of claim 9, wherein the inlet of the reservoir tank is located near the upper end surface of the reservoir tank.

11. The cooling apparatus of claim 1 wherein the valve is a check valve.

12. The cooling apparatus of claim 1 wherein the first heat dissipating mechanism is a condenser.

13. The cooling apparatus of claim 1, further comprising:
a pressurizer disposed in association with the coolant return path to increase a discharge pressure of coolant in the coolant return path.

14. The cooling apparatus of claim 13 wherein the pressurizer is an inverter having an inverter inlet, an inverter outlet and an inverter coolant path therebetween, the inverter inlet being in fluid communication with the reservoir tank, and the inverter outlet being in fluid communication with the coolant return path, and the apparatus further comprising:
a valve interposed between the inverter inlet and the reservoir tank to prevent backflow of coolant from the inverter to the reservoir tank.

15. The cooling apparatus of claim 14, wherein the inverter outlet is connected to The coolant return path upstream of the first heat dissipating mechanism.

16. The cooling apparatus of claim 14, wherein at least a portion of the inverter coolant path is made of porous material.

17. The cooling apparatus of claim 14, wherein the inverter further comprises one or more heat-producing integrated circuits positioned along the inverter coolant path.

18. The cooling apparatus of claim 14, wherein a portion of the coolant return path is adjacent to the inverter coolant path to permit transfer of heat between the coolant return path and the inverter coolant path.

19. The cooling apparatus of claim 13, wherein the inner coolant path includes a plurality of circumferential cooling paths disposed about the circumference of the motor; and the apparatus further comprising:
a coolant quantity equalizer interposed upstream of the circumferential cooling paths and adapted to equalize the flow of coolant into each circumferential cooling path based on its height relative to the coolant stored in the reservoir tank.

20. The cooling apparatus of claim 14, further comprising:
a first connection between the inverter outlet and the coolant return path that is downstream of the heat dissipation mechanism;
a second connection between the inverter outlet and the coolant return path that is upstream of the heat dissipation mechanism;
a switch valve interposed between the inverter outlet and the first and second connections and responsive to a control signal to permit coolant flow through the first connection and to restrict coolant flow through the second connection;
a temperature sensor adapted to generate a signal indicative of the temperature of the coolant path; and
a controller operatively coupled to the switch valve and responsive to the temperature sensor signal to generate the control signal if the temperature sensor signal indicates that the temperature of the inner coolant path is above a predetermined level.

21. The cooling apparatus of claim 14, further comprising:
a switch valve interposed between the inverter inlet and the reservoir tank outlet and responsive to a control signal to increase and decrease the flow of coolant from the reservoir tank into the inverter;
a sensor adapted to generate a signal indicative of the temperature of the inverter coolant path; and
a controller operatively coupled to the switch value and responsive to the temperature sensor signal to generate the control signal to increase the flow of coolant into the inverter when the temperature of the inverter coolant path increases.

22. A motor, comprising:
(a) a rotary shaft, a rotor coupled to the rotary shaft, and a stator surrounding the outer periphery of the rotor;
(b) an inner coolant path disposed in association with hot areas of the rotor and stator; the coolant path having at least one inlet and one outlet and coolant flowing therebetween;
(c) a reservoir tank adapted to store coolant and having an inlet and an outlet, the inlet and the outlet of the reservoir tank positioned above the inner coolant path;
(d) a coolant supply path that connects the outlet of the reservoir tank to at least one inlet of the inner coolant path;
(e) a coolant return path that connects at least one outlet of the inner coolant path to the inlet of the reservoir tank;
(f) at least one valve interposed between the coolant supply path and at least one inlet of the inner coolant path to stop the backflow of coolant toward the coolant supply path from the inner coolant path; and
(g) a first heat-dissipating mechanism disposed in association with the coolant return path to dissipate the heat of the coolant in the coolant return path.

23. The cooling apparatus of claim 1 wherein the coolant return path includes a coolant return path inlet in physical contact with the at least one outlet of the inner coolant path and a coolant return path output in physical contact with the inlet of the reservoir tank.

24. The motor according to claim 22 wherein the coolant return path includes a coolant return path inlet in physical contact with the at least one outlet of the inner coolant path and a coolant return path output in physical contact with the inlet of the reservoir tank.

* * * * *